United States Patent
Rozot et al.

(10) Patent No.: US 9,157,591 B2
(45) Date of Patent: Oct. 13, 2015

(54) SOLAR-POWERED LIGHT FIXTURE AND SYSTEM

(71) Applicant: Photic Planning & Design, Inc., New York, NY (US)

(72) Inventors: Nathalie Rozot, New York, NY (US); Amer Maleh, New York, NY (US)

(73) Assignee: Photic Planning & Design, Inc., New York, NY (US)

( * ) Notice: Subject to any disclaimer, the term of this patent is extended or adjusted under 35 U.S.C. 154(b) by 176 days.

(21) Appl. No.: 13/712,242

(22) Filed: Dec. 12, 2012

(65) Prior Publication Data

US 2014/0160738 A1    Jun. 12, 2014

(51) Int. Cl.

| | |
|---|---|
| F21S 9/03 | (2006.01) |
| F21S 2/00 | (2006.01) |
| F21V 33/00 | (2006.01) |
| F21S 8/08 | (2006.01) |
| F21V 23/04 | (2006.01) |

(Continued)

(52) U.S. Cl.
CPC ............... *F21S 9/037* (2013.01); *F21S 2/005* (2013.01); *F21S 8/08* (2013.01); *F21V 23/0442* (2013.01); *F21V 23/0464* (2013.01); *F21V 23/0471* (2013.01); *F21V 29/15* (2015.01); *F21V 29/83* (2015.01); *F21V 33/006* (2013.01); *F21W 2131/10* (2013.01); *F21Y 2101/02* (2013.01); *H02J 7/35* (2013.01)

(58) Field of Classification Search
CPC .................................. F21S 9/037; F21S 2/005
See application file for complete search history.

(56) References Cited

U.S. PATENT DOCUMENTS

| | | |
|---|---|---|
| 6,784,357 B1 | 8/2004 | Wang |
| 7,021,787 B1 | 4/2006 | Kuelbs |

(Continued)

FOREIGN PATENT DOCUMENTS

| | | |
|---|---|---|
| CN | 201487793 U | 5/2010 |
| DE | 102007015472 A1 | 10/2008 |

(Continued)

OTHER PUBLICATIONS

Solar Path Sun Solutions, A United Lighting Group Company, Highlight Sunbox Technical Specification Sheet, on-line specification sheet, www.solarpathusa.com.

(Continued)

*Primary Examiner* — Elmito Breval
(74) *Attorney, Agent, or Firm* — William P. O'Sullivan; Sheehan Phinney Bass + Green PA

(57) ABSTRACT

A compact, autonomous, solar-powered, modular and aesthetic light fixture that produces useful light levels for general illumination, and includes a housing, photovoltaic cells configured to receive sunlight proximate an upper portion of the housing, concentrating optics at least partially covering the photovoltaic cells, a light source configured to emit light from the housing, an energy storage device to receive energy from the photovoltaic cells and to provide energy to the light source, an electronic energy management system for controlling charge associated with the photovoltaic cells, the energy storage device and the light source. The light fixture can be rotated 360° to accommodate any solar irradiation while sustaining a consistent appearance, it can accommodate a variety of mounting conditions, and it can be combined to form lighting systems in a variety of configurations.

41 Claims, 21 Drawing Sheets

(51) Int. Cl.
*F21W 131/10* (2006.01)
*F21Y 101/02* (2006.01)
*F21V 29/15* (2015.01)
*F21V 29/83* (2015.01)
*H02J 7/35* (2006.01)

(56) References Cited

U.S. PATENT DOCUMENTS

2008/0266846 A1* 10/2008 Cheng et al. .................. 362/183
2008/0272278 A1    11/2008 Shewa et al.
2009/0303703 A1* 12/2009 Kao et al. ..................... 362/183
2010/0302764 A1    12/2010 Yu et al.
2010/0302765 A1* 12/2010 Yu et al. ....................... 362/183
2011/0242802 A1    10/2011 Work et al.

FOREIGN PATENT DOCUMENTS

GB    2463635 A      3/2010
WO    2007121765 A1  11/2007
WO    2010096775 A1  8/2010

OTHER PUBLICATIONS

International Search Report and Written Opinion issued for Application PCT/US13/73823, dated Mar. 21, 2014.

* cited by examiner

FIG 3F
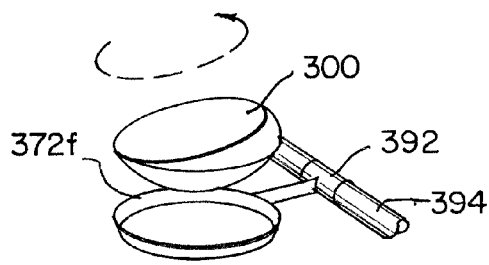

FIG 4D
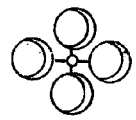

FIG 4M
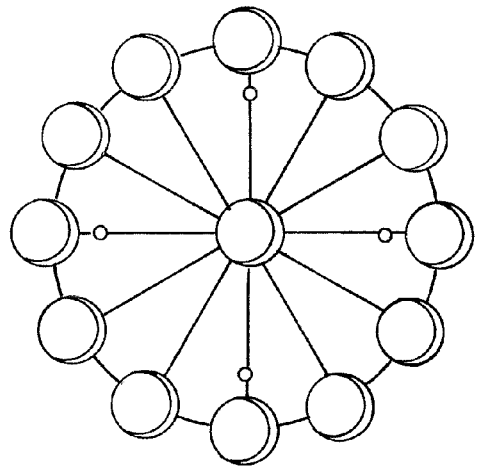
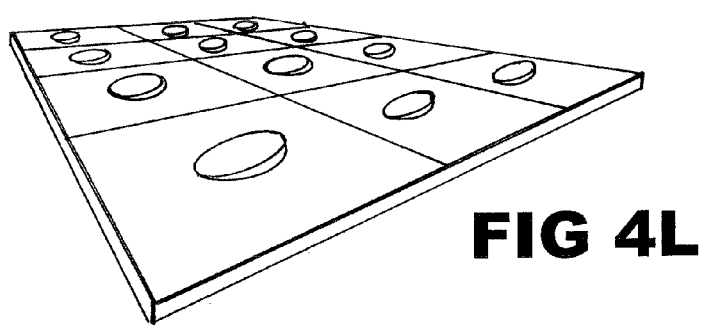
FIG 4L

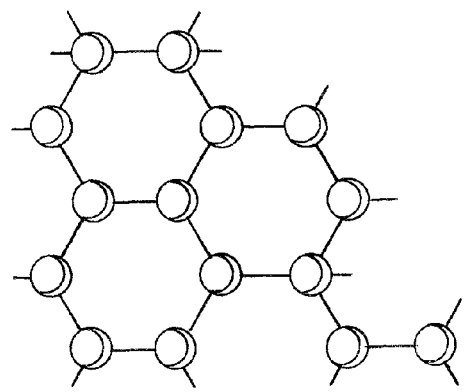
FIG 4Q
FIG 4R
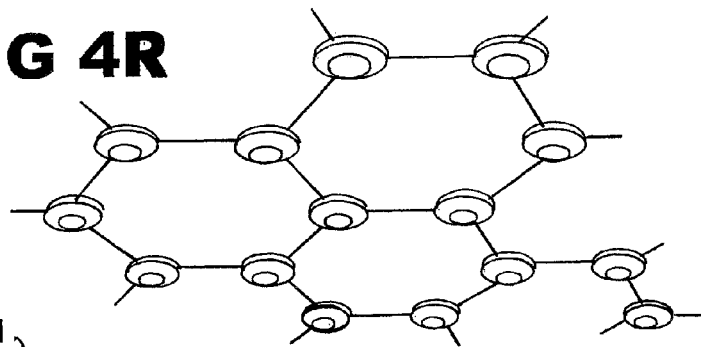
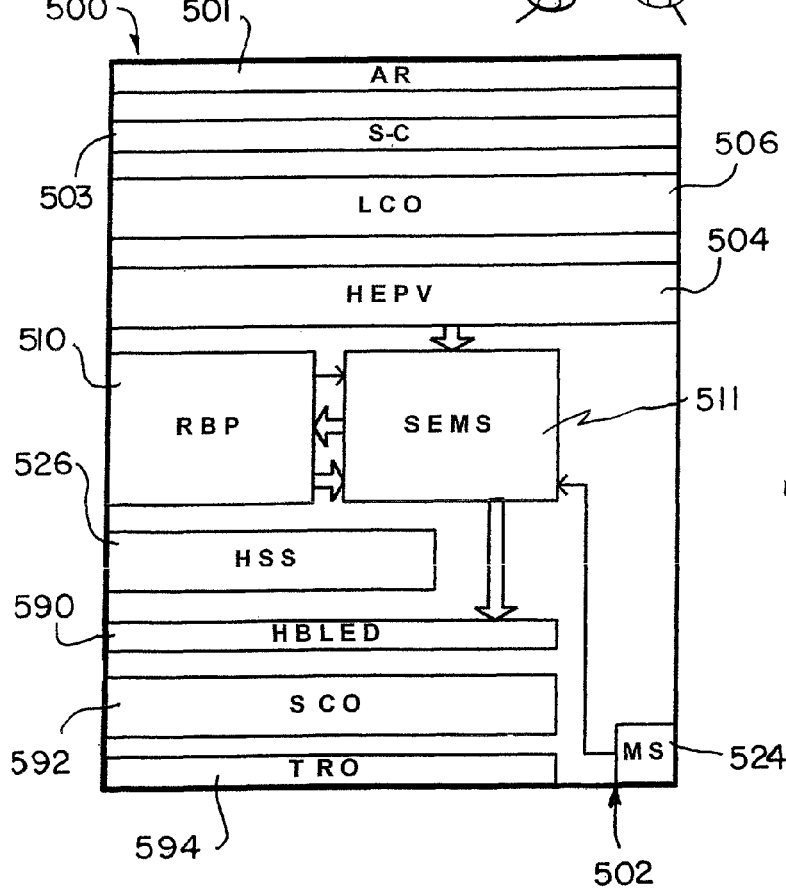
FIG 5A
LEGEND
⇨ POWER FLOW
→ INPUT SIGNAL

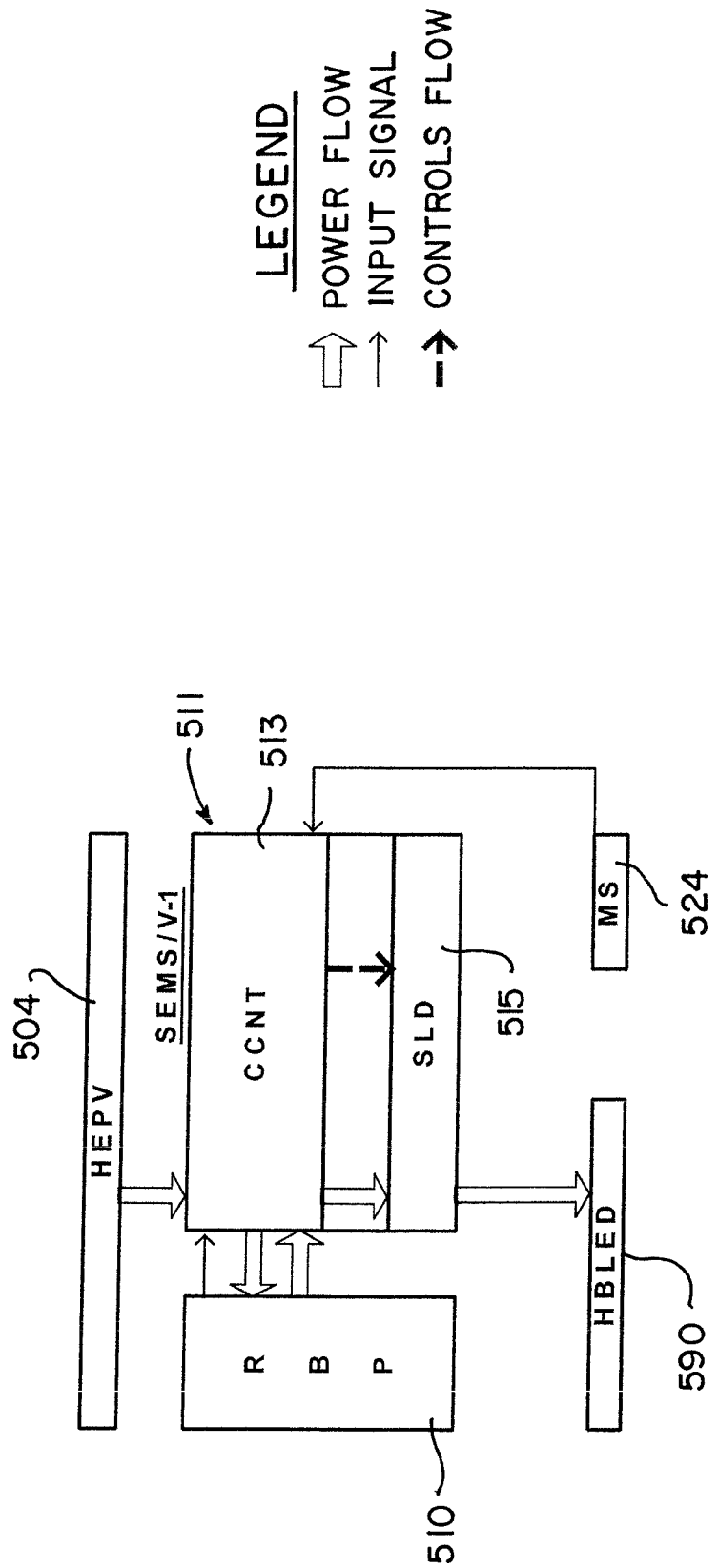

LEGEND
⇨ POWER FLOW
→ INPUT SIGNAL

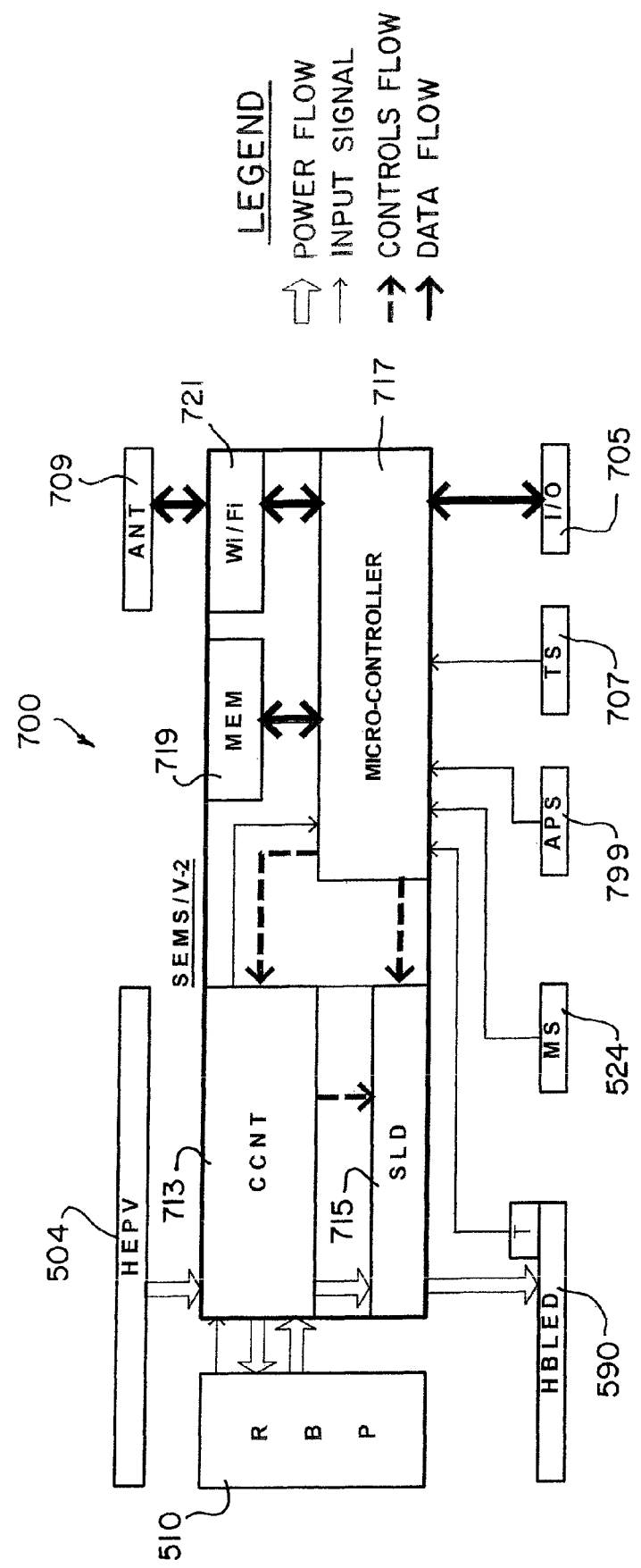

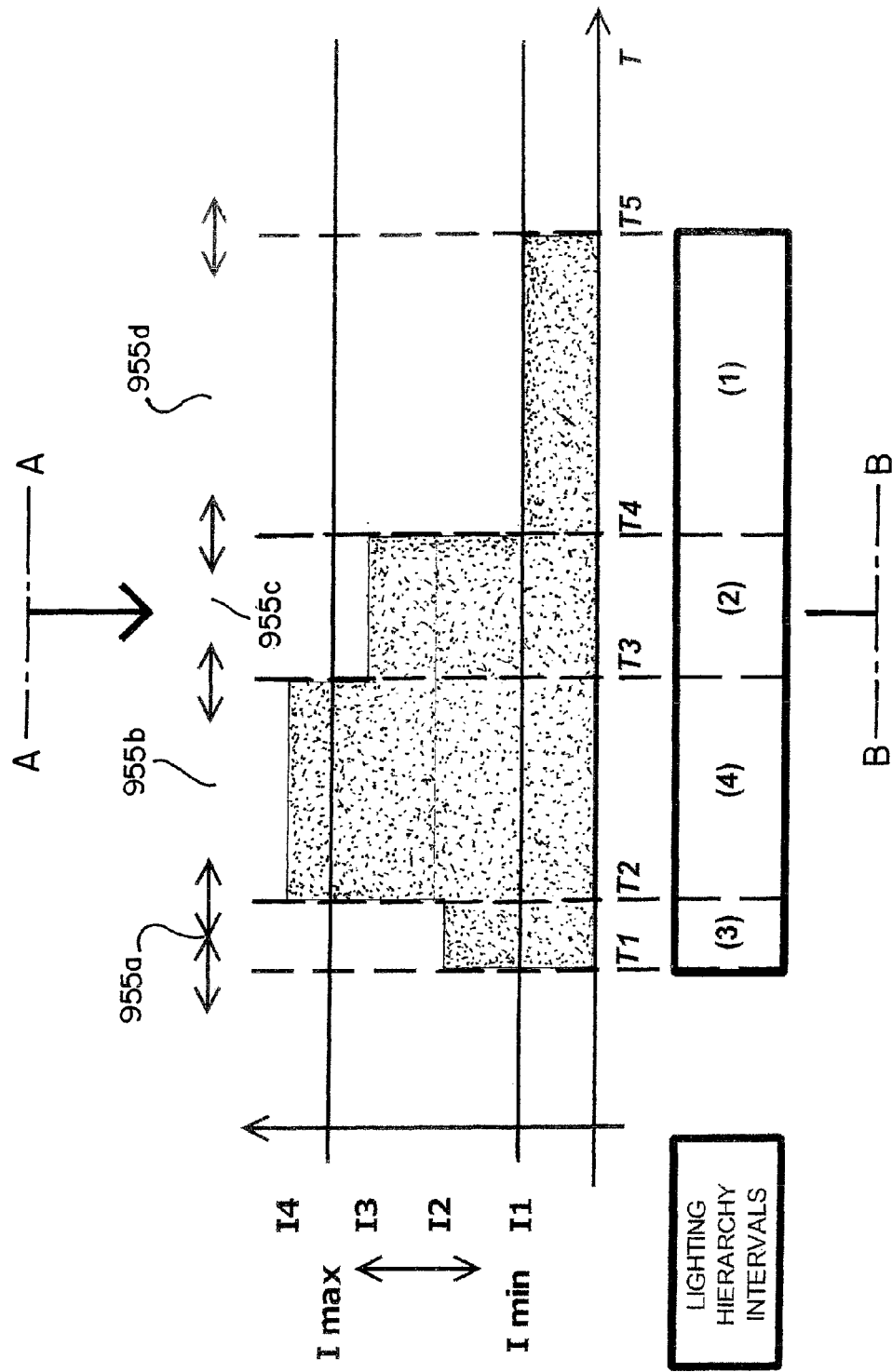

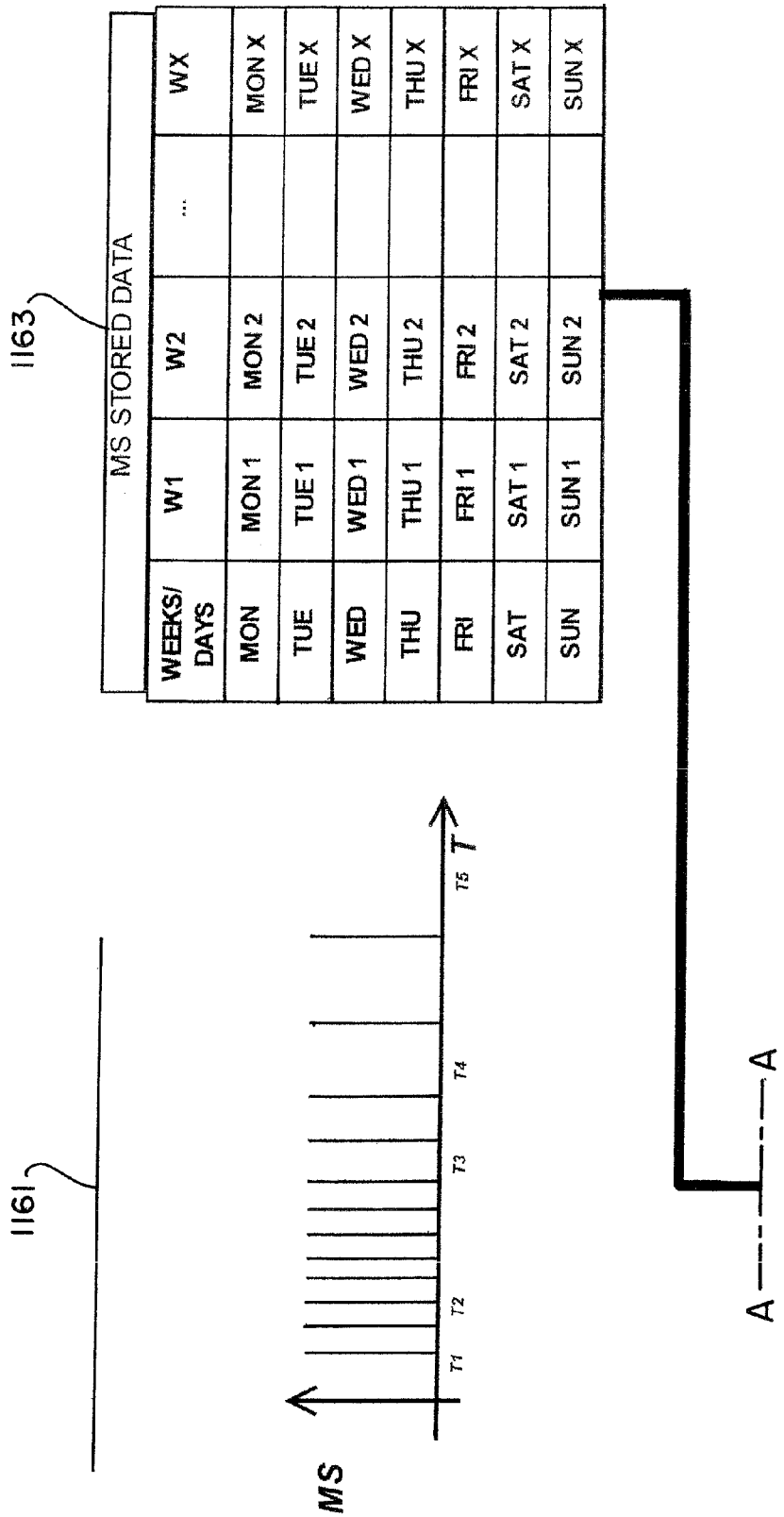

FIG 12B

| |
|---|
| SP<br>For Days 1-2-3-4-5-6-7 |
| SP BUT MS at interval (1)<br>For Days 1-2-3-4-5-6-7 |
| SP BUT MS at intervals (1) + (2)<br>For Days 1-2-3-4-5-6-7 |
| SP BUT MS at intervals (1) + (2) + (3)<br>For Days 1-2-3-4-5-6-7 |
| MS<br>For Days 1-2-3-4-5-6-7 |
| MS AND Imax at interval (1)<br>For Days 1-2-3-4-5-6-7 |
| MS AND Imax at intervals (1) + (2)<br>For Days 1-2-3-4-5-6-7 |
| MS AND Imax at intervals (1) + (2) + (3) + (4)<br>For Days 1-2-3-4-5-6-7 |
| MS AND Imax at intervals (2) + (3) + (4)<br>AND Imin at interval (1)<br>For Days 1-2-3-4-5-6-7 |
| MS AND Imax at intervals (3) + (4)<br>AND Imin at intervals (1) + (2)<br>For Days 1-2-3-4-5-6-7 |
| MS AND Imax at intervals (4)<br>AND Imin at intervals (1) + (2) + (3)<br>For Days 1-2-3-4-5-6-7 |
| MS AND Imin at intervals (1) + (2) + (3) + (4)<br>For Days 1-2-3-4-5-6-7 |
| OFF |

A—A

SOLAR-POWERED LIGHT FIXTURE AND SYSTEM

FIELD OF INVENTION

This disclosure relates to a solar-powered light fixture and associated systems.

BACKGROUND

Market penetration for solar-powered lighting products for architectural and landscape applications has been slow. In general, such products face several barriers to adoption including, for example, deficient and utilitarian design, complicated specification and installation processes and unrefined light output.

SUMMARY OF THE INVENTION

In one aspect, a compact, autonomous, solar-powered, modular light fixture includes a housing, photovoltaic cells configured to receive sunlight proximate an upper portion of the housing, concentrating optics atop the photovoltaic cells that reduce the tilt and increase performance and reliability and a lower incidence angle throughout the year, a light source configured to emit light from the housing, an energy storage device to receive energy from the photovoltaic cells and to provide energy to the light source, an electronic energy management system for the controlling charge associated with the photovoltaic cells, the energy storage device and the light source.

In another aspect, a lighting system (or installation) includes one or more of the compact, autonomous, solar-powered, modular light fixtures and one or more support structures supporting the one or more light fixtures. The light fixture can accommodate a variety of mounting conditions, and be combined to form lighting systems in a variety of configurations.

In some implementations, the compact, autonomous, solar-powered modular light fixture is accompanied by or mounted on a universal mounting system or components thereof (e.g., the mounting hardware and components disclosed herein). The universal mounting system can take a variety of specific forms. In general, a universal mounting system is applicable to all (or most) situations or purposes and/or is widely adaptable in position, range of use, etc. Moreover, universal is a term regularly used to describe the compatibility of products that can accommodate a wide range of situations/accessories etc.

In some implementations, one or more of the following advantages may be present.

For example, a light fixture may result that addresses both form and function problems associated with current solar-lighting technologies. The light fixture may provide highly-efficient, superior performance and functionality in a compact, autonomous solar-powered lighting module that is practical, but also smart and aesthetic. The light fixture may simplify the design, specification, production and installation of solar-powered solutions for area lighting applications.

Additionally, the light fixture may provide good-quality lighting in a site for an extended period of time, with useful light levels for general illumination and a variety of light distribution patterns that meet the various requirements and specifications of any given application.

The light fixture can be rotated 360° to accommodate any solar irradiation while sustaining a consistent appearance.

Other features and advantages will be apparent from the description and drawings, and from the claims.

BRIEF DESCRIPTION OF THE DRAWINGS

FIGS. 3A-3F are perspective views showing various exemplary installations, in which a light fixture is mounted to a support structure.

FIGS. 4A-4H and 4K-4R are schematic representations showing a various installations with different numbers of light fixtures.

FIG. 5A is a schematic representation showing certain components in an implementation of a light fixture and the flow of power and certain signals between the illustrated components.

FIG. 6 is a schematic representation showing some of the components of the light fixture in FIG. 5A with details of the electronic energy management system.

FIG. 8 is a schematic representation showing some of the components of the light fixture in FIG. 7A with details of the electronic energy management system.

Like reference numerals reflect like elements.

DETAILED DESCRIPTION OF THE DRAWINGS

Figure 1:
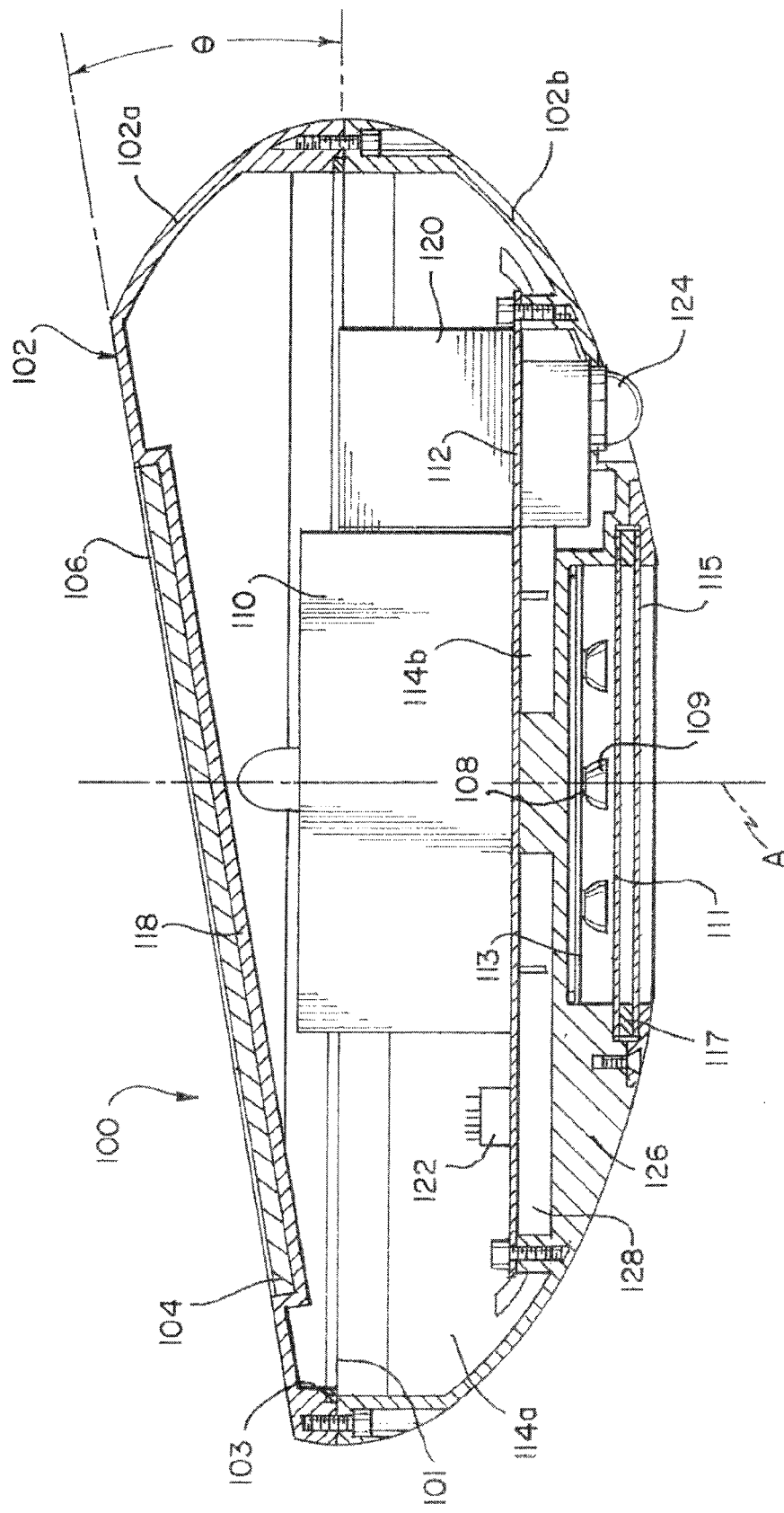
FIG. 1 is a cross-sectional, side view of an exemplary light fixture.

FIG. 1 is a cross-sectional, side view of an exemplary solar-powered light fixture 100.

The illustrated light fixture 100 has a housing 102 and a plurality of photovoltaic cells 104 exposed to receive incident sunlight at an upper portion of the housing 102. Concentrating optics 106 cover the photovoltaic cells 104 and focus/direct the incident sunlight onto the photovoltaic cells. A light source 108 is configured to emit light in a downward direction from a lower portion of the housing 102. An energy storage device 110 (e.g., a battery) is inside the housing 102. The energy storage source 110 is configured to receive and store electrical energy from the photovoltaic cells 104 and to provide energy to the light source 108. Electronic circuitry 120 (including, for example, an electronic energy management system for controlling charge associated with the photovoltaic cells, the energy storage device and the light source) is also provided inside the housing 102.

In a typical implementation, when the sun is shining, incident sunlight arrives at the photovoltaic cells 104, which convert the light energy into electrical energy to charge or maintain the charge on the internal energy storage device 110. The internal energy storage 110 device energizes the light source 108 to illuminate a target area.

The illustrated light fixture 100 is compact, autonomous and modular.

Its compact nature is facilitated by virtue of high-efficiency components being brought together in a relatively compact housing in a manner that facilitates high-performance of the light fixture overall.

The light fixture is autonomous by virtue of its ability, once programmed and/or set up, to operate and perform various functions and processes independently of external influence or action (e.g., from a human user).

The light fixture is modular by virtue of its ability to easily, conveniently and in an aesthetic manner be used together with other similar or identical light fixtures to produce a greater or lesser amount of light in a target area depending on the requirements of a particular application.

The light fixture 100 is adapted to be useful in a wide range of different lighting applications including, for example, pathway lighting, bicycle path lighting, pedestrian area lighting and parking lot lighting. Typically, the light fixture 100 is able to produce lighting levels that satisfy one or more typically adopted or recommended light levels for outdoor applications by the Illuminating Engineering Society of North America (IESNA), for instance the Recommended Practices for Lighting for Exterior Environments RP-33-99, and the 2011 Municipal Lighting Ordinance (MLO). In general, the light fixture typically produces an amount of light that is accepted as useful for general illumination and considerably greater than the amount of light typically produced by solar-powered decorative light fixtures, light markers or accent lights. In some implementations, for example, the lighting level produced by the light fixture is at least 500 (or at least 700) lumens at maximum (i.e., 100%) output.

The light fixture 100 can be mounted in a variety of different environments, either alone or as part of a system of similar or identical fixtures. Whether mounted alone or in a group of similar or identical fixtures, the light fixture 100 has a design such that the final installation presents a simple and aesthetic appearance.

In a typical implementation, the light fixture 100 is mounted in such a manner that a lower portion of its housing 102b rests upon a support structure, with a portion of the light fixture 100 extending through the opening defined by the support structure. The support structure can be virtually any kind of support structure, such as, for example, part of a bracket with or without tenon that may be connected, for example, to a pole, a fence, a wall or the like; part of a suspended cable system; part of an architectural element, such as a canopy, marquee or the like; etc., or a combination of several of these support structures. See, e.g., FIGS. 3A-3F.

The design of the light fixture 100 is such that the number of light fixtures to be installed in a particular location can be varied easily in order to produce a higher or lower light level depending on particular needs in that location. Because of its sleek, aesthetic appearance and relatively simple manner of mounting, a group of similar or identical light fixtures can be combined easily to increase lighting levels and produce a lighting system with a sleek and aesthetic overall appearance.

Other features and advantages will be apparent from the description and figures contained herein.

Referring again to the light fixture 100 in FIG. 1, the illustrated housing 102 includes an upper portion 102a and a lower portion 102b. In some implementations, the upper portion 102a of the housing and the lower portion 102b of the housing 102 are physically separate pieces that may be joined together using adhesive or other fastening means, for example, at a horizontally-disposed seam (e.g., 101 in FIG. 1). In other implementations, the upper portion 102a of the housing 102 and the lower portion 102b of the housing 102 are integrally formed. In some implementations, the housing may be otherwise divided, for example, along a vertically-disposed seam (not shown in FIG. 1) that allows the right side and left side of the housing 102 to be separated from one another. In the illustrated implementation, there is an o-ring gasket 103 that seals the interface between the upper portion 102a and lower portion 102b of the housing at seam 101.

In the illustrated implementation, the lower portion 102b of the housing 102 is substantially symmetrical about an axis A that extends through the center of the lower portion 102b of the housing and vertically upward through the upper portion 102a of the housing. In some implementations, the photovoltaic cells 104 and concentrating optics 106 will lie in a plane that is substantially perpendicular to axis A. In some of those implementations, the top portion 102a of the housing 102 is also substantially symmetrical about axis A. However, in the illustrated implementation, the photovoltaic cells 104 and the concentrating optics 106 have a slight angle of tilt ($\theta$) relative to horizontal. It is generally desirable that this angle of tilt ($\theta$) be as small as possible. Typically, the angle is no greater than 15° to maintain an aesthetic and visually consistent appearance regardless of the orientation of the module.

The illustrated housing 102 is hollow and, therefore, defines an internal compartment that contains a number of internal components. The internal compartment in the illustrated housing 102 is separated by an interior baffle 112 into an upper chamber 114a and a lower chamber 114b.

In the illustrated implementation, the interior baffle 112 is coupled at its edges to an inner surface of the lower portion 112b of the housing 112. However, in other implementations, the interior baffle 112 can be coupled to an inner surface of the upper portion 112a of the housing 112, instead.

In the illustrated light fixture 100, the interior baffle 112 has an upper surface that is contoured to define structural features (e.g., trays and the like) that facilitate supporting one or more of the components contained within the upper chamber 114a. Likewise, the outer surface of the upper portion 102a of the housing 102 is configured to define structural features (i.e., a tray 118) to support the photovoltaic cells 104 and concentrating optics 106. In the illustrated implementation, the tray 118 is disposed at an angle relative to horizontal, although, in some implementations, the tray 118 may be substantially horizontal.

In a typical implementation, the illustrated housing has a height (in the vertical direction in FIG. 1) of about 6 inches and a cross-sectional diameter (in a horizontal plane in FIG. 1) of about 16 inches. The precise dimensions of the light fixture 100, of course, can vary considerably depending on a variety of factors. In general, the housing 102 can be made of any kind of substantially rigid material (e.g., metal, plastic or the like). Moreover, the housing 102 material is generally suitable to withstand exposure to various weather conditions.

The photovoltaic cells 104 in the illustrated light fixture 100 are arranged in a planar array and positioned in the angled tray structure 118 formed in the upper portion 102a of the housing 102. In general, the photovoltaic cells 104 generate electricity by converting solar radiation using semiconductors based on the photovoltaic effect.

The photovoltaic cells 104 may include any number of materials such as crystalline silicon cells (monocrystalline or polycrystalline), and/or terrestrial or space multijunction cells using with multiple p-n junctions (also known as III-V Heterojunction cells with Intrinsic Thin Film) and/or any other type of high-efficiency photovoltaic cells. Exemplary monocrystalline silicon cells, for example, may have a maximum power rating of 15 W, a power tolerance of +/−5%, a Voc of 21.6V, an Isc of 0.93 A, a Vmp of 18V, an Imp of 0.83 A and be available from Sunpower, USA.

The planar array of photovoltaic cells 104 in the illustrated implementation is disposed at an angle θ relative to perpendicular. In a typical implementation, this angle θ is no more than 15° and, preferably, the angle is as close to 0° as practical in order to facilitate making the light fixture 100 as compact as possible. In a typical implementation, the high efficiency nature of the photovoltaic cells 104 and the concentrating optics 106 above the photovoltaic cells 104 help facilitate making this angle θ as small as possible. In some implementations, the planar array of photovoltaic cells 104 lies in a substantially horizontal plane with virtually no angle whatsoever.

In the illustrated implementation, the concentrating optics 106 form a planar array of optical elements and cover the photovoltaic cells 104. The optics can include a micro-lens with an optic that bends the light closer to the horizon downwards towards the board, and an optional index matching gel between the lens and photovoltaic panel that minimizes reflections off the back surface of the lens. In general, the concentrating optics 106 operate to direct and focus sunlight onto the photovoltaic cells 104. In general, the concentrating optics help to enable the photovoltaic cells 104 to produce a greater amount of electrical energy than they otherwise would be able to produce in the absence of the concentrating optics 106. In some implementations, this allows the angle θ of the photovoltaic cells 104 to be reduced without compromising the photovoltaic cells' ability to produce electrical energy. This contributes to reducing the size of the light fixture 100 overall. Indeed, the applicant has found that, in some implementations, the performance of a 10° panel with concentrating optics (e.g., optical lenses & index matching) can equal or surpass the performance of a 30° panel with clear glass.

The concentrating optics 106 may provide passive concentration using refractive and/or reflective components that optimize solar irradiance onto the photovoltaic cells and, thereby, may reduce the quantity of photovoltaic cells required to achieve a desired output and contribute to the compactness of the lighting fixture. In addition, in some implementations, the concentrating optics 106 may tend to boost the power output of the photovoltaic cells 104, both for typical operation and during winter months-when solar radiation is limited, and tends to have a lower angle. In addition, in some implementations, the concentrating optics 106 refract and bend light to decrease or eliminate the tilt of the photovoltaic cells, which allows for a consistent appearance of the fixture regardless of the orientation, and contributes to the aesthetic quality of the module. In some implementations, the concentrating optics 106 include low concentration optics (LCO).

The energy storage device 110 is configured to receive electrical energy from the photovoltaic cells 104 and to provide energy to the light source 108. The energy storage device 110 can be virtually any type of device or physical media that is able to store energy to perform useful operations at a later time. In various implementations, the energy storage device can be a battery, a capacitor or the like. One exemplary battery that may serve as the energy storage device 110 is the Nano-phosphate® High Power Lithium Ino Cell ANR26650M1-B Battery, available from A123 Systems, Inc. of Waltham, Mass.

The light source 108 is configured to emit light in a downward direction from a lower portion of the housing 102. The light source 108 can include a variety of light source technologies including, for example, solid state lighting (light-emitting diodes or LEDs, organic light-emitting diodes or OLEDs), fluorescent lights, incandescent lights, etc. One exemplary light source 108 is the MC-E LED, available from CREE, Inc. of Durham, N.C.

The light fixture 100 can include one or more optical elements covering the light source 108 to control the shape of or otherwise influence the character of the light produced by the light source 108. For example, in the illustrated implementation, there is sealed glass 111 and tertiary optics 115 beneath the light source 108. The seal is facilitated by a pressure foam gasket 117 at the interface of the glass and tertiary optics 115 to the housing 102.

In some implementations, there are other or different optics covering the light source 108. For example, in some implementations, collimator optics 109 are mounted below the light source 108. Collimator optics can include one or more optical elements that help align the light rays emitted by the light source 108 toward a particular area. In general, this helps produce a higher amount of light in the particular area than otherwise would be produced if the collimator optics were absent. A resulting effect is that the light fixture 100 with the collimator optics can produce a desired level of light in the particular area with fewer light sources or lower powered light sources than would be required if the collimator optics were absent.

In general, the tertiary optics 115 such as filters or lenses can further control the shape of the light emitted by the light source 108. The tertiary optics can be either factory locked with a particular orientation or can be field-adjustable by an end-user. They can be combined or interchangeable.

In various implementations, the tertiary optics 115 may include other or different layers of optical elements to help control the shape and efficiency of light transmission from the light source 108 to a particular area to be illuminated.

The illustrated light fixture 100 includes a heat sink 126. The heat sink 126 is thermally coupled to the light source 108 and is a passive component that cools the light source 108 by dissipating heat to the bottom surface of the housing 102*b* and consequently into the surrounding air. In various implementations, the heat sink 126 can have different physical configurations. For example, in some implementations, the heat sink includes a plurality of fins (or other protrusions) that essentially increase the surface area in contact with the cooling medium surrounding it, such as the air. In some implementations, thermal adhesives, thermal grease or thermal heat pads 113 fills the air gap between the heat sink and the light source 108 to help improve its thermal performance.

In the illustrated implementation, there is an air gap 128 between the top of the heat sink 126 and the bottom of the interior baffle 112. This air gap 128 enables air to flow over the heat sink to further enhance the heat sink's ability to dissipate heat from the light source.

The fins convey the heat to the bottom housing 102*b* whose larger area helps dissipate the heat at a higher convection rate. In general, cooling ensures lamp life longevity and consistent output performance of the light source 108.

The illustrated light fixture 100 also has a motion sensor 124. The motion sensor 124 is mounted to the bottom of the interior baffle 112 and extends from through the lower portion 102*b* of the housing 102 in a downward direction. The motion sensor 124 can utilize a variety of technologies to implement its functionality. In general, the motion sensor 124 is configured to sense motion in the area intended to be illuminated by the light fixture 100. In some implementations, the motion sensor 124 is a photosensor or photodetector. As discussed herein, in a typical implementation, the light fixture 100 can use information from the motion sensor to efficiently control the illumination level being omitted by the light fixture to the target illumination area over time.

The electronic circuitry inside the housing 102 generally facilitates efficient operation of the photovoltaics 104, the energy storage device 110, the light source 108, the motion sensor, and/or a variety of other electrical or electronic components that may be associated with the light fixture 100. For example, in some implementations, the electronic circuitry (e.g., the energy management system, in particular) helps to optimize the charging of the energy storage device 110 from the electrical energy produced by the photovoltaics 104, helps to ensure efficient delivery of electrical energy from the photovoltaics 104 and/or the energy storage device 110 to the light source 108, and/or helps to facilitate producing flexible light output profiles over time.

The electronic energy management system can include a variety of electronic components and circuitry. In some implementations, for example, the electronic energy management system includes a charger controller 120 and a driver circuit 122 for the light source 108. In addition, some implementations also include a microcontroller (e.g., a microprocessor), a memory storage device (e.g., a memory bank) and/or a transceiver (e.g., a Wi-Fi transceiver). Various other components and supporting electronic circuitry may be included in the housing 102 as well.

In various implementations, the light fixture 100 may include other components.

For example, in some implementations, the light fixture 100 would include an input/output port with weatherproof access from the outside. In a typical implementation, the input/output port would facilitate connecting a wired connection to an external computer-based component, such as a monitor, controller or the like. This would enable monitoring from the external computer-based component various aspects of the light fixture's performance as well as uploading and downloading information (e.g., software and data) to and from the light fixture.

In addition, some implementations of the light fixture 100 would include a temperature sensor contained within the housing and configured to measure temperature inside the housing. In a typical implementation, the temperature sensor is operable to collect and provide information to the light fixture about the internal temperature of the housing, and will turn off the operation of the fixture if it detects overheating. Alternatively, the temperature sensor may cause a modification to operation of the fixture to prevent overheating. In one instance the charging rate of the battery can be reduced, in another instance the light output and power consumption of the LEDs can be reduced. In extreme heat conditions it would turn off the operation of the fixture to prevent damage to the internal components.

In addition, some implementations of the light fixture 100 include a wireless antenna contained within or coupled to the housing. In a typical implementation, the wireless antenna would enable the wireless exchange of information (e.g., software and data) between light fixtures grouped in a system, and/or between a single or multiple light fixtures and some external computer-based component, such as a monitoring device, controller or the like.

Figure 2:
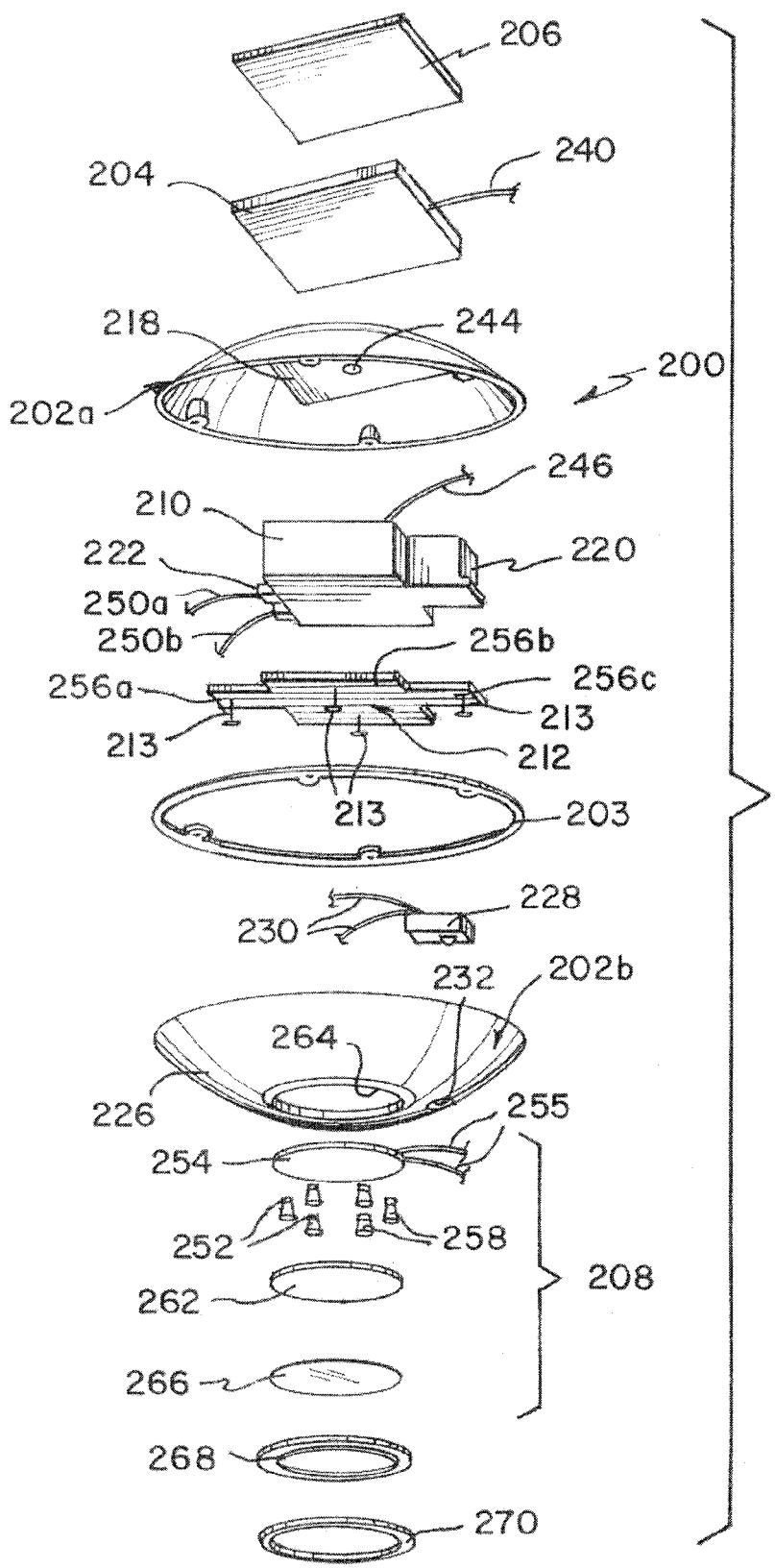
FIG. 2 is an exploded perspective view of an exemplary light fixture.

FIG. 2 is an exploded view of an exemplary light fixture 200.

At the top of FIG. 2, the illustrated light fixture 200 includes a panel with low concentration optics 206 and a panel below that with high-efficiency photovoltaic cells 204. The panel with the high-efficiency photovoltaic cells 204 has an electrical cord 240 that extends from its bottom surface in a downward direction. The electrical cord 240 is configured to deliver electrical energy generated by the photovoltaic cells 204 to the other components (e.g., the energy storage device 210, charger/controller 220, etc.) inside the light fixture 200.

The illustrated light fixture 200 has a housing with an upper portion 202a and a lower portion 202b. The upper portion 202a of the housing defines a tray 218 in its upper surface that is disposed at an angle (typically close to zero and typically no greater than 15°) relative to horizontal. The tray 218 is sized and shaped to receive and support the photovoltaic cells 204 and the low concentration optics 206. There is an aperture 244 in approximately the center of the tray 218 that extends through the upper portion 202a of the housing. The aperture 244 is sized and positioned so that the electrical cord 240 from the panel of photovoltaic cells 204 can pass through and be connected to the charger/controller 220 beneath the tray 218.

In the illustrated implementation, the energy storage device has an electrical cord 246. The electrical cord 246 is configured to electrically and mechanically engage the charger controller 220.

There is an o-ring seal 203 shown beneath the upper portion 202a of the housing. In a typical implementation, the o-ring seal 203 provides a seal at an interface between the upper portion 202a of the housing and the lower portion 202b of the housing when they are brought together.

The illustrated light fixture 200 includes an energy storage device 210 (e.g., a battery or the like), a charger/charge controller 220 and a driver circuit 222 for the light source 208. Beneath these components, there is an interior baffle 212, whose external edges are sized and shaped to rest upon and/or be coupled to an inner surface of the bottom portion 202b of the housing. The interior baffle 212 has an upper surface that defines three trays 256a, 256b, 256c configured to contain the driver circuit 222, the energy storage device 210 and the charger/controller 220, respectively. In the illustrated implementation, the interior baffle 212 is configured to lie in a substantially horizontal plane when resting upon the inner surface of the lower portion 202b of the housing.

The illustrated light fixture 200 includes a motion sensor device 228. The lower portion 202b of the housing defines an opening 232, through which the motion sensor device 228 can have a clear site to the below surroundings of the fixture 200, and is able to detect motion. The motion sensor device 228 is attached to the lower portion 202b of the housing using mounting hardware (e.g., screws). Water proof silicone is applied to the area of contact between the motion sensor device 228 on the lower portion 202b of the housing to provide a seal between the exterior and the housing 202.

There is one or more electrical cords 230 that extends from the motion sensor device 228. That electrical cord can be connected to one or more of the components above the floor mounting plate 212, such as the charger/controller 220 and/or the LED driver 222.

Mounting hardware 213 (e.g., screws) facilitate securing the driver circuit 222, the energy storage device 210 and the charger/controller 220 to the interior baffle 212.

The illustrated light fixture 200 includes a light source 208 proximate the bottom of the light fixture 220. The illustrated light source 208 has a heat sink 226, a printed circuit board 254, LED chips 252 configured to be mounted to a lower surface of the printed circuit board 254, collimator optics 258 for each LED chip 252, and a glass cover 262. There is one or more electrical cords 255 that extend in an upward direction from the printed circuit board 254. That electrical cord can pass through the aperture in the bottom of the interior baffle 212 and be connected to one or more of the components above the interior baffle 212, such as the charger/controller 220 and/or the LED driver 222.

Beneath the light source 208 is the lower portion 202*b* of the housing. The lower portion 202*b* of the housing defines an opening 264, through which the light source 208 can emit light—in a downward direction. In assembly, glass cover 262 is sealed to the edge of the opening 264 with water proof silicone and provides a seal at that point of the light fixture 200.

Beneath the bottom portion 202*b* of the housing is a laminate 266 that includes tertiary optics. As discussed above, for example, in a typical implementation, the tertiary optics further control the shape of the light emitted by the light source 108. In general, the resulting effect is that a light fixture 200 that includes tertiary optics can produce a desired level of light in the particular area with fewer light sources or with lower power light sources than otherwise would be required if the tertiary optics were absent.

A gasket 268 and trim piece 270 are beneath the tertiary optics laminate 266. The trim piece 270 is adapted to be coupled to the lower portion 202*b* of the housing and the gasket 268 provides a seal between the exterior and the laminate 266.

In a typical implementation, the housing of a light fixture (e.g., light fixture 100 or light fixture 200) is configured so as to rest upon a support structure and extend through an aperture defined by the support structure.

In some implementations (e.g., where the panel of photovoltaic cells and the panel of low concentration optics lie in a substantially horizontal plane when the light fixture is coupled to a support structure), the light fixture is substantially symmetrical about a vertical axis that extends through the center of both the upper and lower portions of the housing. In those implementations, the light fixture appears substantially the same regardless of which direction the photovoltaic cells are oriented.

In some implementations, (e.g., where the photovoltaic cells and low concentration optics do not lie in a plane that is angled relative to horizontal when the light fixture is coupled to the support structure), the lower portion of the light fixture is substantially symmetrical about the vertical axis and the upper portion of the housing, even with the slightly angled upper surface of the panels, presents an aesthetically simple and pleasing appearance. In those implementations, the light fixture, when viewed from below, appears substantially the same regardless of which direction the photovoltaic cell module is oriented (e.g., angled). In addition, in those implementations, the light fixture overall retains a sleek and aesthetic appearance regardless of which direction the photovoltaic cell module is oriented.

FIGS. 3A-3F show various exemplary installations, in which a light fixture 300 is mounted to a support structure 372*a*, 372*b*, 372*c*, 372*d*, 372*e*, 372*f*. In each installation, the support structure is a surface that defines an opening that the lower portion of the light fixture's housing can rest upon, with the lower portion of the light fixture 300 extending at least partially through the opening.

Figure 3A:
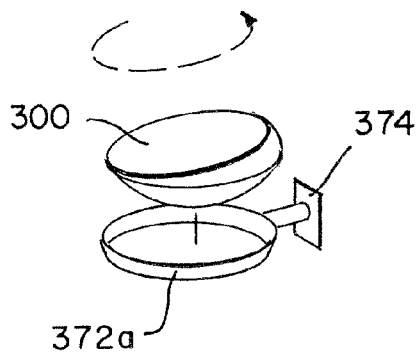

FIG. 3A, for example, shows an exemplary wall-mount installation, in which the light fixture 300 is installed using a wall-mount mounting bracket 374. In the illustrated implementation, the wall-mount mounting bracket 374 is configured to extend in a substantially perpendicular direction from the wall and defines a circular support structure 372*a*, upon which the light fixture 300 can rest. The circular support structure 372*a* defines a circular opening, through which a bottom portion of the light fixture 300 can extend. In some implementations, fastening devices (e.g., screws) may be inserted in a radially-inward direction through the circular support structure to facilitate gripping the light fixture when installed.

Figure 3B:
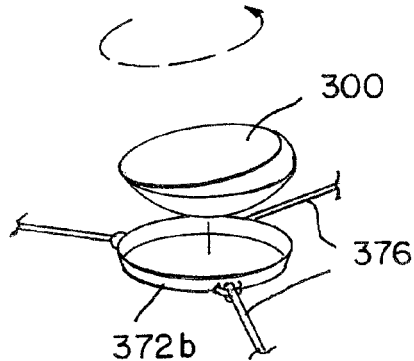

FIG. 3B shows an exemplary wire-mount installation, in which the light fixture 300 is installed using a system of cables 376 that may extend, for example, between opposite walls of a site, between spaced-apart poles, etc., and/or a combination of these. In the illustrated implementation, the suspended cable system defines a circular support structure 372*b*, which may be a separate rigid mounting ring connected to the cable system, upon which the light fixture 300 can rest. The circular support structure 372*b* defines a circular opening, through which a bottom portion of the light fixture 300 can extend. In some implementations, fastening devices (e.g., screws) may be inserted in a radially-inward direction through the circular support structure to facilitate gripping the light fixture when installed.

Figure 3C:
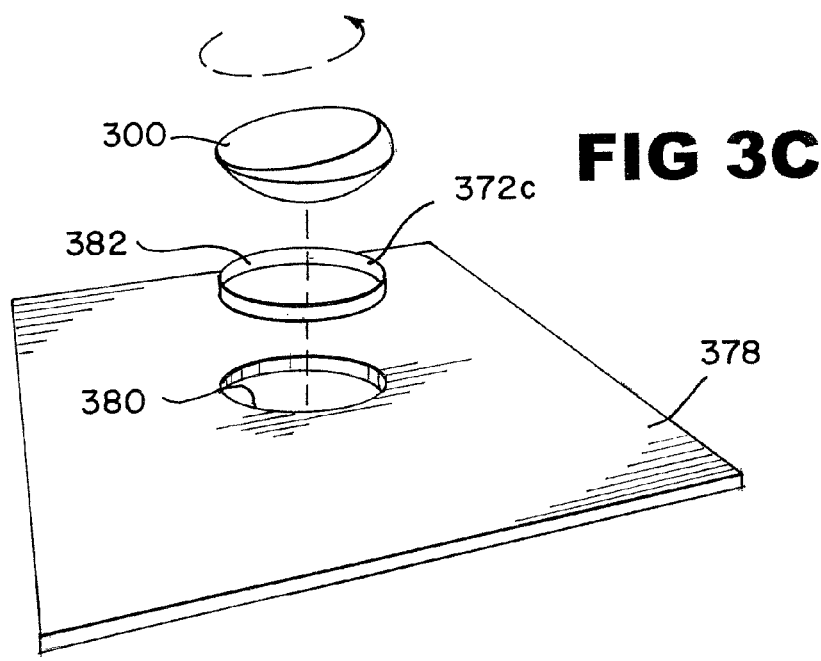

FIG. 3C shows an exemplary canopy- or roof-mount installation, in which the light fixture 300 is installed through an opening 380 in a canopy 378. In the illustrated implementation, a bracket member 382 is inserted into the opening 380 and defines a circular support structure 372*c*, upon which the light fixture 300 can rest. The circular support structure 372*c* defines a circular opening, through which a bottom portion of the light fixture 300 can extend. In some implementations, fastening devices (e.g., screws) may be inserted in a radially-inward direction through the circular support structure to facilitate gripping the light fixture when installed.

Figure 3D:
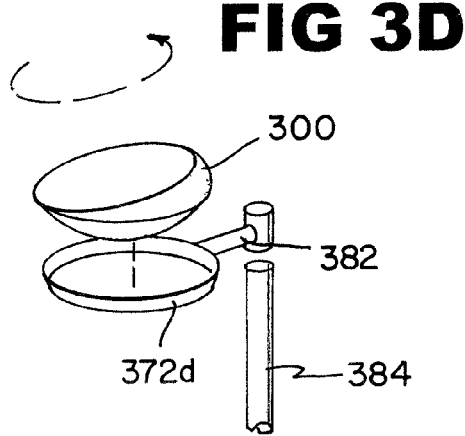

FIG. 3D shows an exemplary pole-mount installation, in which the light fixture 300 is installed using a pole-mounted mounting bracket 382. In the illustrated implementation, the pole-mounted mounting bracket 384 is configured to be coupled to a pole 386 using fasteners (e.g., screws or the like) and extend away from the pole 386. The pole-mount bracket 384 defines a circular support structure 372*d*, upon which the light fixture 300 can rest. The circular support structure 372*d* defines a circular opening, through which a bottom portion of the light fixture 300 can extend. In some implementations, fastening devices (e.g., screws) may be inserted in a radially-inward direction through the circular support structure to facilitate gripping the light fixture when installed.

Figure 3E:
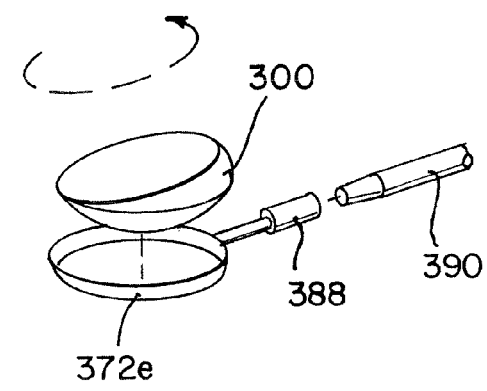

FIG. 3E shows an exemplary tenon-mount installation, in which the light fixture 300 is installed using a tenon-mounted mounting bracket 388. In the illustrated implementation, the tenon-mounted mounting bracket 388 is configured to be coupled to a tenon pole or any variation of tenon mounting 390 using fasteners (e.g., screws or the like) and extend away from the tenon pole 390. The tenon-mount bracket 388 defines a circular support structure 372*e*, upon which the light fixture 300 can rest. The circular support structure 372*e* defines a circular opening, through which a bottom portion of the light fixture 300 can extend. In some implementations, fastening devices (e.g., screws) may be inserted in a radially-inward direction through the circular support structure to facilitate gripping the light fixture when installed.

FIG. 3F shows an exemplary fence-mount installation, in which the light fixture 300 is installed using a fence-mounted mounting bracket 392. In the illustrated implementation, the fence-mounted mounting bracket 392 is configured to be coupled to a fence pipe or structure 394 in a two-part bracket system using fasteners (e.g., screws or the like). The fence-mount bracket 392 defines a circular support structure 372*f*, upon which the light fixture 300 can rest. The circular support structure 372*f* defines a circular opening, through which a bottom portion of the light fixture 300 can extend. In some implementations, fastening devices (e.g., screws) may be inserted in a radially-inward direction through the circular support structure to facilitate gripping the light fixture when installed.

Utilizing any of the installation techniques shown in FIG. 3A-3F, any number of light fixtures 300 can be installed to illuminate a particular target area with ease resulting in an installation whose overall appearance is sleek and aesthetic.

FIGS. 4A-4H and FIGS. 4K-4R are schematic representations or perspective views of various installations having different numbers of light fixtures 300 and different physical configurations.

Figure 4A:
Figure 4B:
Figure 4C:
Figure 4E:
Figure 4F:
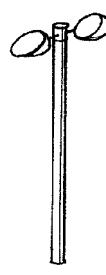
Figure 4G:
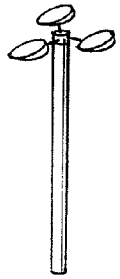
Figure 4H:
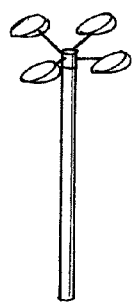

The installation in FIG. 4A and FIG. 4E have one light fixture 300, the installation in FIG. 4B and FIG. 4F have two light fixtures 300, the installation in FIG. 4C and FIG. 4G have three light fixtures 300 and the installation in FIG. 4D and FIG. 4H have four light fixtures 300.

Figure 4K:
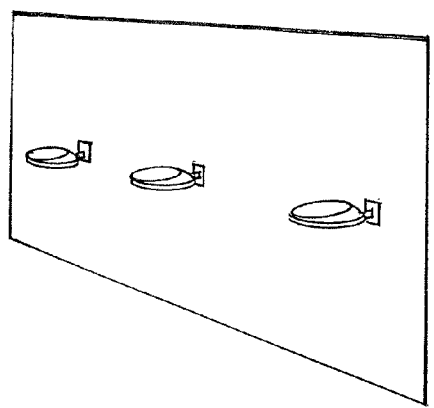

FIG. 4K is a schematic representation showing a perspective view of a wall-mounted installation (as in FIG. 3A) with varying quantities of light fixtures 300.

FIG. 4L is a schematic representation showing a perspective view of a canopy- or roof-mounted installation (as in FIG. 3C) with varying quantities of light fixtures 300.

Figure 4N:
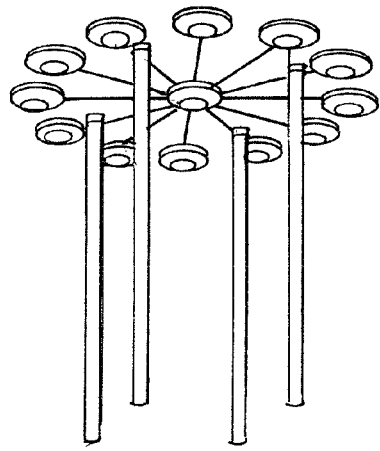

FIG. 4M and FIG. 4N are schematic representations showing a top view and perspective views of a hybrid pole and cable-mounted installation (as in FIG. 3B and FIG. 3D) with varying quantities of light fixtures 300.

Figure 4O:
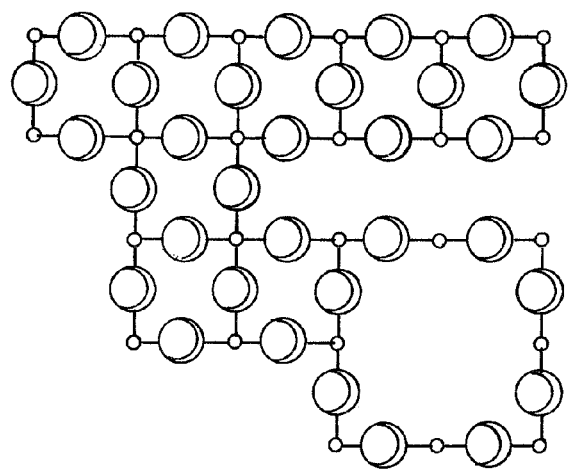

FIG. 4O is a schematic representation showing a top view of a cable-mounted installation (as in FIG. 3B) with varying quantities of light fixtures 300 organized in an orthogonal manner.

Figure 4P:
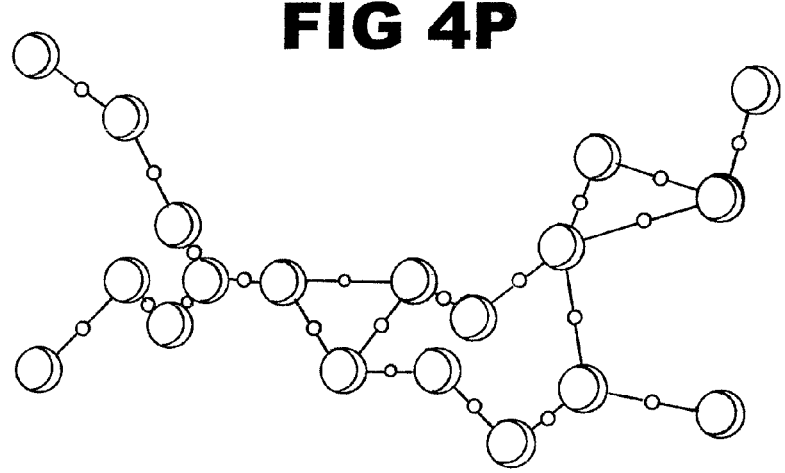

FIGS. 4P, 4Q and FIG. 4R are schematic representations showing top and perspective views of cable-mounted installations (as in FIG. 3B) with varying quantities of light fixtures 300 arranged in non-orthogonal patterns and layouts. These installations could be anchored to structural supports such as buildings, poles, fences and other elements.

FIGS. 4A-4R provide multiple examples that demonstrate the ease with which the desired light levels for a target area can be achieved by installing any number of light fixtures, and also illustrate the versatility and aesthetics of the lighting systems that can be designed.

FIG. 5A is a schematic representation showing certain components in an implementation of a light fixture 500 and the flow of power and certain signals between the illustrated components.

The illustrated light fixture 500 includes a housing 502 and high-efficiency photovoltaic cells 504 exposed at an upper portion of the housing 502 to receive sunlight and low-concentration optics 506 to direct sunlight toward the high-efficiency photovoltaic cells 504.

The illustrated light fixture 500 includes self-cleaning provisions 503. The self-cleaning provisions may include self-cleaning glass and, in general, has a surface which keeps itself free of dirt and grime. The self-cleaning provisions can be implemented utilizing any one of several possible technologies. For example, the self-cleaning provisions may be implemented using a thin film titania coating. The film can be applied in a number of ways including by spin coating of organo-titanate chelated precursor and then heat treating at elevated temperatures. In general, this type of self-cleaning glass cleans itself in two stages. In the photocatalytic stage, ultraviolet light breaks down organic dirt on the glass and makes the glass superhydrophilic. Then, rain, can simply wash away the dirt, leaving almost no streaks, because the rain water spreads evenly on superhydrophilic surface. In a typical implementation, the self-cleaning provisions 503 help ensure that a desired amount of solar energy reaches the photovoltaic cells 504 without significant degradation over time due to the accumulation of dirt and grime.

The illustrated light fixture 500 also has an anti-reflective coating 501. In general, an anti-reflective coating is an optical coating that reduces reflection. The anti-reflective coating may be applied to any surface outside the high-efficiency photovoltaic cells. In a typical implementation, the anti-reflective coating helps improve the efficiency of the light fixture since less sunlight is lost due to reflection.

An anti-reflective coating can be provided using any number of possible technologies. For example, in some implementations, the anti-reflective coating may include transparent thin film structures with alternating layers of contrasting refractive index. The layer thicknesses may be chosen to produce destructive interference in the beams reflected from the interfaces, and constructive interference in the corresponding transmitted beams.

The illustrated light fixture 500 has an energy storage device, which, in the illustrated implementation, is a rechargeable battery pack 510, as well as an electronic energy management system 511 (e.g., a smart energy management system) that is adapted to controlling charge associated with the energy storage device. In some implementations, the electronic energy management system 511 includes a computer-based processor and may include computer-based memory storage as well.

The illustrated light fixture 500 also includes a light source that includes high brightness light-emitting diodes (LEDS) 590, secondary optics 592 and tertiary optics 594. In a typical implementation, the secondary optics 592 and tertiary optics provide control over the shape of the light being produced by the LEDS 590. A heat sink 526 is thermally coupled to the light source and draws heat away from the LED junction to help maintain life and color consistency of the lights produced by the light source.

The illustrated light fixture also includes a motion sensor 524. In general, the motion sensor 524 is configured to sense motion in the area intended to be illuminated by the light fixture 500.

According to the illustrated example, power flows from the high-efficiency photovoltaic cells 504 to the electronic energy management system 511. In addition, power flows from the electronic energy management system 511 to the rechargeable battery pack 510 to facilitate charging and maintaining charge on the battery. Power also flows from the rechargeable battery pack 510 to the electronic energy management system 511 and from the electronic energy management system to the LEDs 590 to energize the LEDs 590.

In addition, according to the illustrated example, signals flow from the rechargeable battery pack 510 to the electronic energy management system 511 to indicate, for example, an amount of charge remaining on the battery. Also, signals flow from the motion sensor 524 to the electronic energy management system 511 to indicate sensed motion in the area to be illuminated by the light fixture 500.

In a typical implementation, the smart electronic energy management system SEMS 511 controls the light fixture 500 in such a manner as to help preserve battery life (e.g., so that the battery is able to provide needed energy over a specific target number of nights without needing to be recharged) while helping to ensure that a reasonable amount of light is provided in the target illumination area at different times of the night (e.g., according to the particular needs of the particular lighting application). In some instances, this may be achieved, for example, by dividing night output operation into several intervals, and assigning different light output levels to be produced during each interval with the aim of producing a reasonable amount of light based on the particular lighting needs in a given installation and maintaining battery life for a target duration (e.g., 7 nights) without needing to recharge the battery.

Figure 5B:
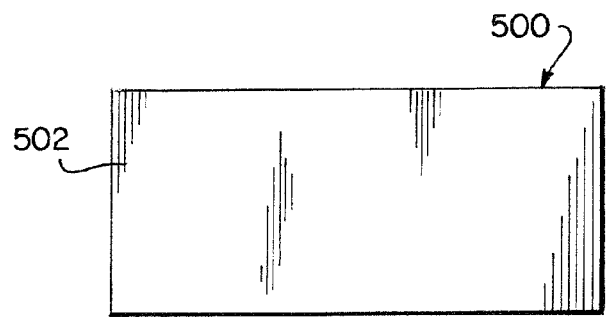
FIG. 5B is a perspective side view of the light fixture in FIG. 5A.
Figure 5C:
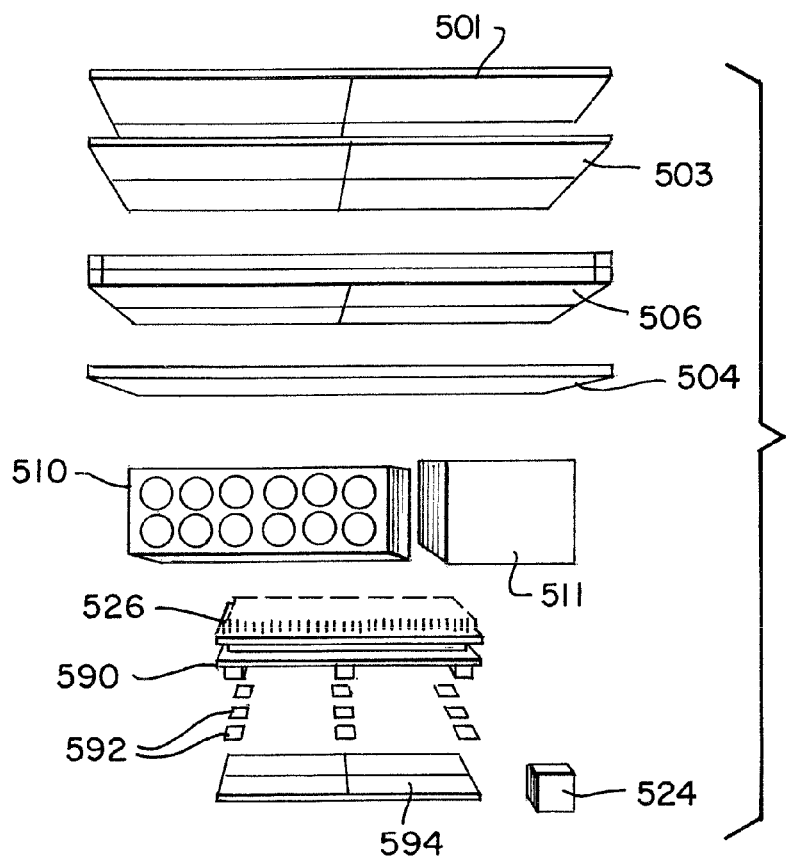
FIG. 5C is an exploded perspective view of the light fixture in FIG. 5A.

FIG. 5B is a perspective view and FIG. 5C is an exploded view of the light fixture 500 in FIG. 5A.

FIG. 6 is a schematic representation showing some of the components in FIG. 5A with details of the electronic energy management system 511.

In particular, the illustrated electronic energy management system 511 includes a charger controller 513 and a smart LED driver 515.

In some implementations, the charger controller 513 may be operable to implement a smart maximum power point tracking (MPPT) algorithm. In a typical implementation, this kind of algorithm can help maximize the amount of energy harvested from the high-efficiency photovoltaic cells 504 and also provide load control to prevent over discharge of the rechargeable battery pack 510. In certain implementations, the MPPT technology is able to track a module (of Photovoltaics) maximum power point voltage (Vmp) as it varies with weather conditions, ensuring that maximum power is harvested from the module through the course of the day.

In some implementations, the smart LED driver 515 is a pulse or strobe-type driver that is capable of acting as a high power driver for the LEDs 590. In some implementations, the smart LED driver can take in any standard dimming signal and provide several constant current LED driving currents. The smart LED driver 515 also typically implements an algorithm that detects overheating of the LED substrate, for example, and automatically adjusts current output to the LED(s) 590 to preserve LED life.

According to FIG. 6, power flows from the high-efficiency photovoltaic cells 504 to the charger controller 513 portion of the electronic energy management system 511. In addition, power flows from the charger controller 513 portion of the electronic energy management system 511 to the rechargeable battery pack 510 to facilitate charging and maintaining charge on the battery. Power also flows from the rechargeable battery pack 510 to the charger controller 513 portion of the electronic energy management system 511, from the charger controller 513 portion to the smart LED driver 515 portion and from the smart LED driver 515 portion to the LEDs 590 to energize the LEDs 590.

In addition, according to the illustrated example, signals flow from the rechargeable battery pack 510 to the charger controller 513 portion of the electronic energy management system 511 to indicate, for example, an amount of charge remaining on the battery. Also, signals flow from the motion sensor 524 to the charger controller 513 portion of the electronic energy management system 511 to indicate sensed motion in the area to be illuminated by the light fixture 500.

A control signal flows from the charger controller 511 to the smart LED driver 515 to control operation of the smart LED driver 515.

In some implementations, the light fixture 500 operates substantially as follows.

The charger controller 513 detects day/night transition through the electric charge from the high-efficiency photovoltaics 504. The charger controller 513 collects power from the high-efficiency photovoltaics 504 during the day and charges the rechargeable battery pack 510. Once night time is detected, the charger controller 513 draws power from the rechargeable battery pack 510 and sends it to the smart LED driver 515, which in turn powers the LEDs 590.

Figure 9A:
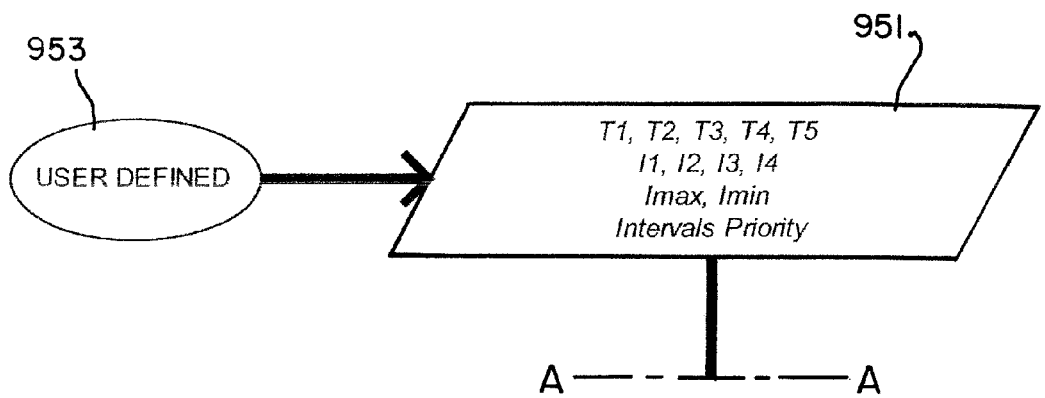
FIG. 9 is a flowchart of a process wherein a light fixture operates under a User Defined Mode (UDM).
Figure 9C:
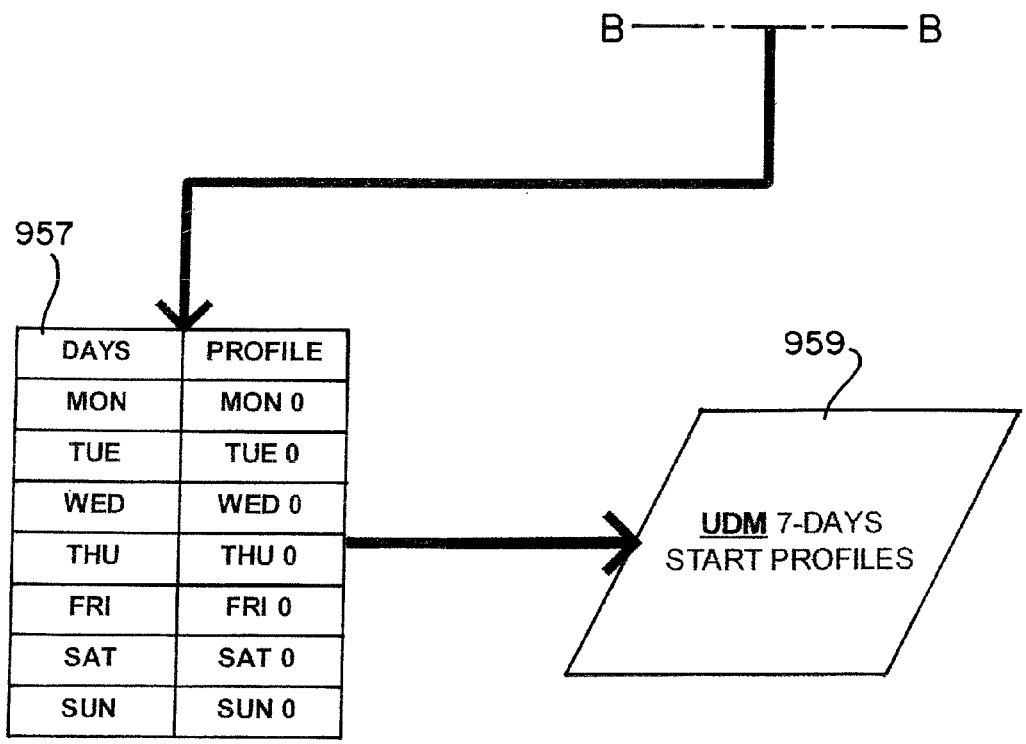
Figure 10A:
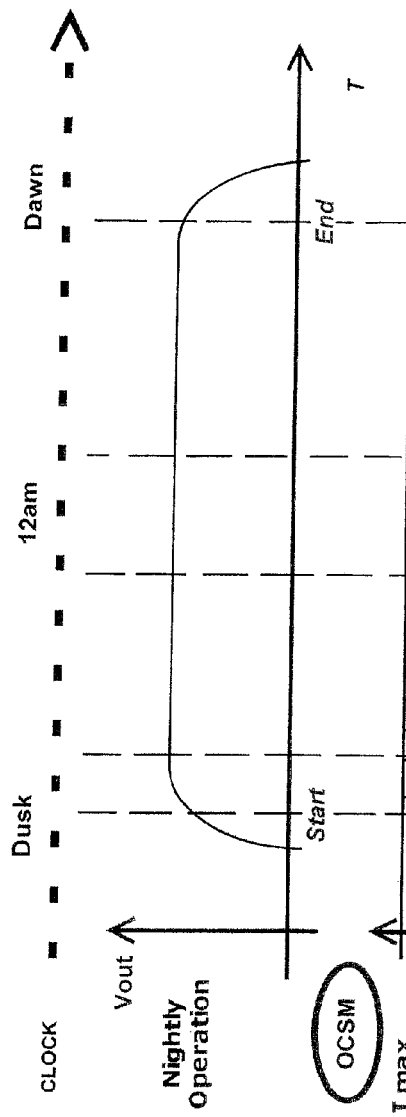
FIG. 10 includes charts that represent various aspects of light fixture operation under different operating modes.
Figure 10B:
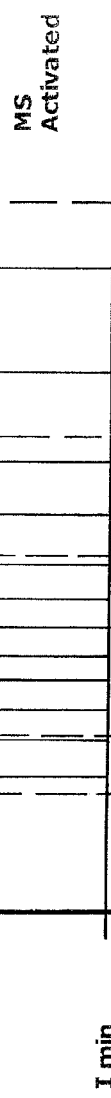
Figure 10C:
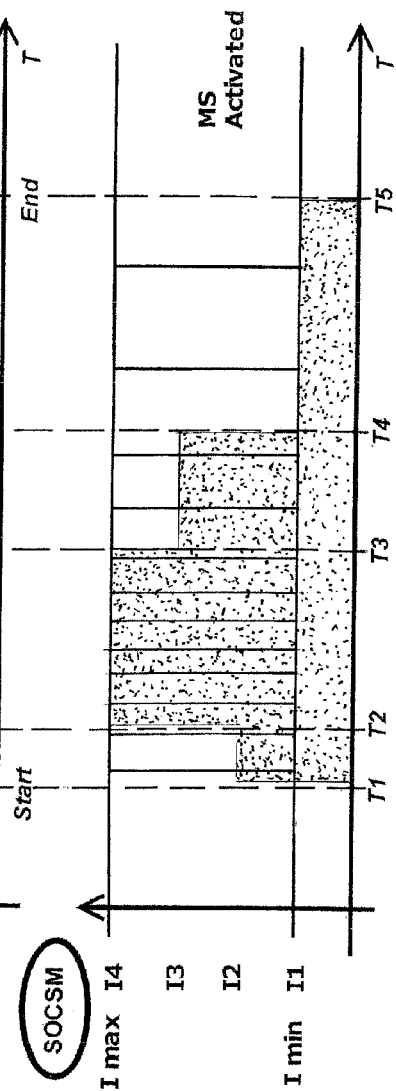
Figure 10D:
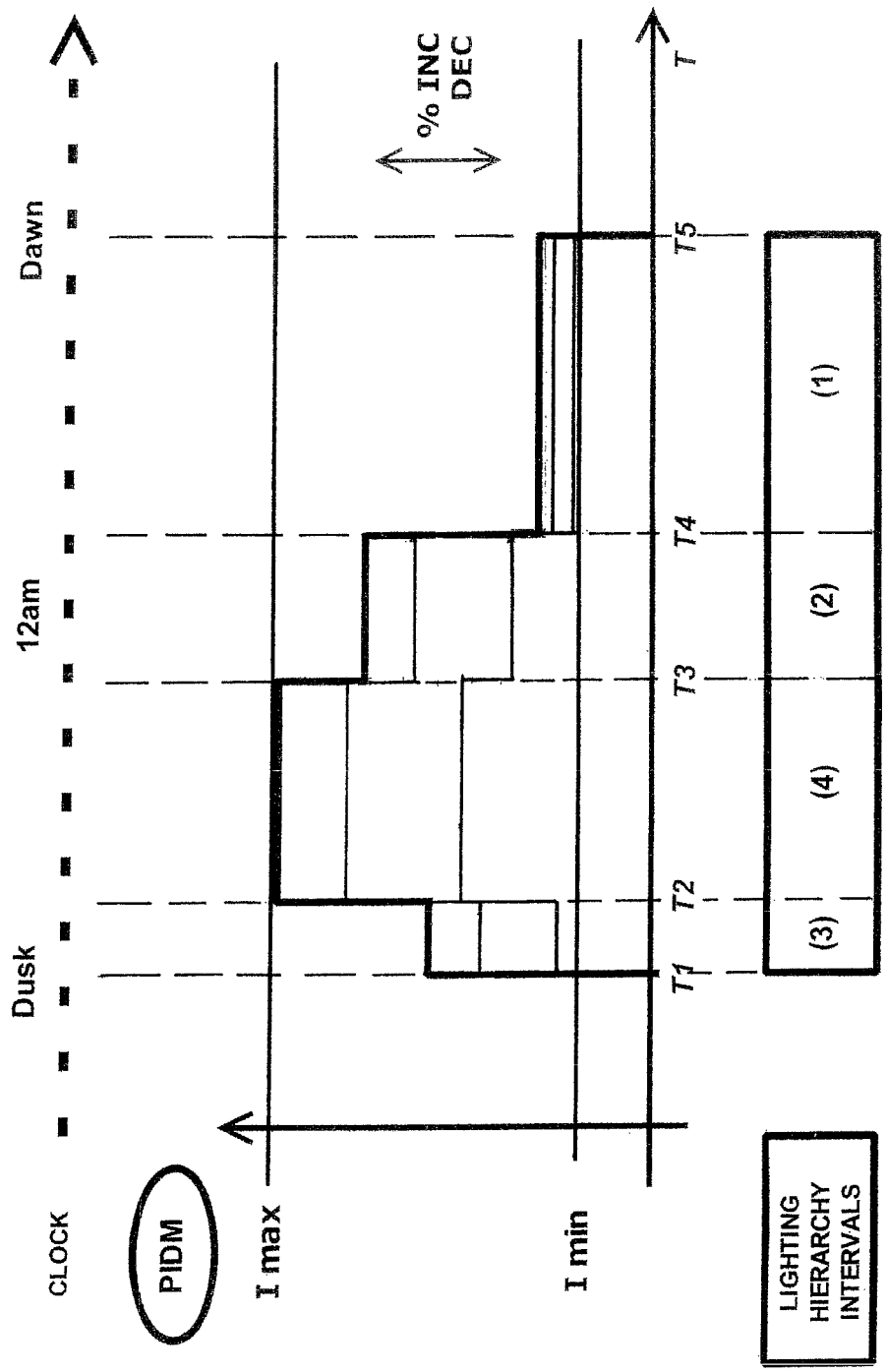

In some instances, the electronic energy management system 511 operates according to a User Defined Mode UDM (see, e.g., FIG. 9). The UDM dictates the nightly operation profile based on values selected by a human user or programmer, for example, at time of specification and may be programmed and downloaded into the charger controller 513, for example, at the factory.

In some implementations, such as the one represented in FIG. 9, the UDM allows the user or programmer to divide the night time operation into several intervals, specifying the start and stop time for each interval. The user or programmer is also able to assign a different light output level to each respective interval.

Once the charger controller 513 detects that the battery charge has dipped below a threshold level, it switches the operation of the light fixture from UDM to Occupancy Sensing Mode OCSM (see, e.g., profile B in FIG. 10). As represented in FIG. 10, for example, in OCSM mode, the charger controller 513 drives the LEDs at a minimal light output of Imin until and unless the motion sensor 524 detects motion (e.g., activity). When motion is detected the motion sensor 524 sends a signal to the charger controller 513 which in turn sends a signal to the smart LED driver 515 to ramp up the light output to a predetermined higher light output level Imax, which is higher than the minimal light output level.

After ramping up, if no further motion is detected by the motion sensor 524 (e.g., after about 15 seconds or so) and no signal is sent to the charger controller 513, the charger controller 513 then sends a signal back to the smart LED driver 515 to ramp back down the minimal output light level, Imin.

Additionally, in a typical implementation, if the charger controller 513 detects a critically low charge on the rechargeable battery pack 510 at night, it may shut off the light output in order to not over-discharge and damage the rechargeable battery pack 510. Once the rechargeable battery pack 510 charge is once again restored to an acceptable level, the mode of operation returns to normal.

Figure 7B:
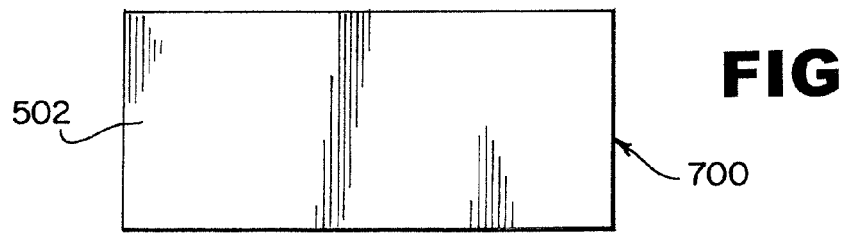
FIG. 7B is a perspective side view of the light fixture in FIG. 7A.
Figure 7C:
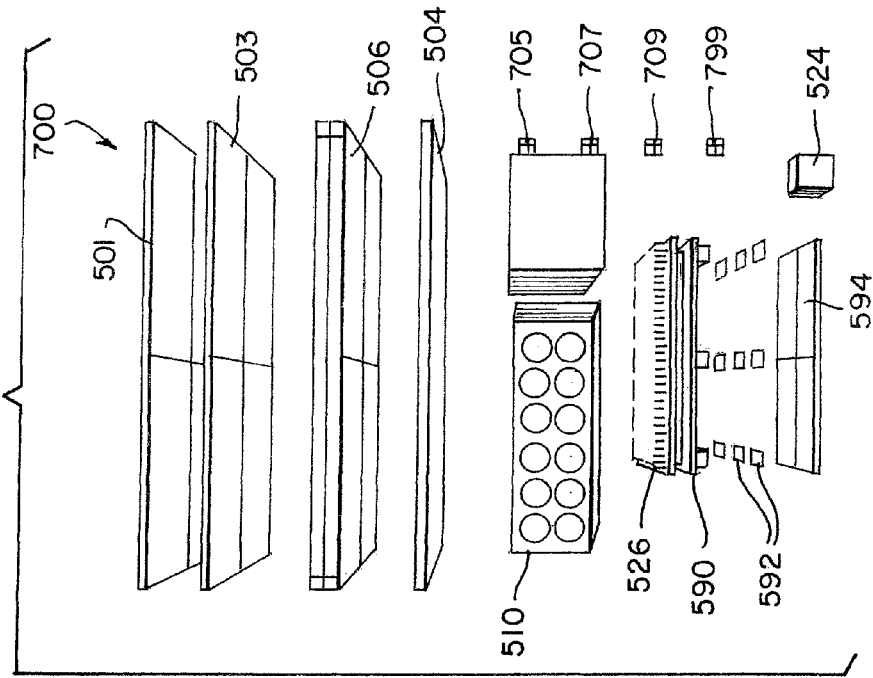
FIG. 7C is an exploded perspective view of the light fixture in FIG. 7A.
Figure 7A:
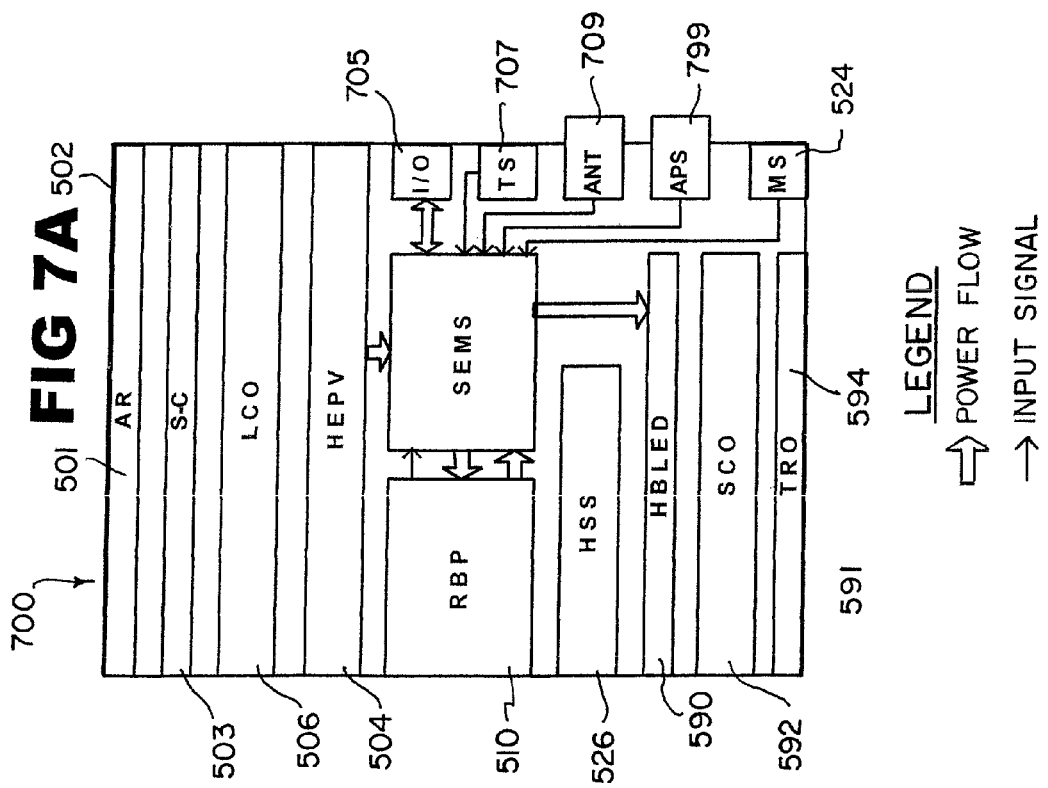
FIG. 7A is a schematic representation showing certain components in an implementation of a light fixture and the flow of power and certain signals between the illustrated components.

FIG. 7A is a schematic representation showing certain components in an implementation of a light fixture 700 and the flow of power, signals and data between the illustrated components.

The light fixture 700 of FIG. 7 is similar to the light fixture 500 of FIG. 5 except the light fixture 700 also has an input-output port 705, a temperature sensor 707, an antenna 709 and an ambient photosensor 799. In addition, as discussed below in some detail, the electronic energy management system 711 in FIG. 7 is somewhat different than the electronic energy management system 511 in FIG. 5.

In a typical implementation, the input-output port 705 is located within or on the surface of the light fixture's housing 502. If located within the housing, the input-output port 705 may be accessible, for example, through a weather-proof access panel or the like. In various implementations, the input-output port 705 may accommodate a wired connection to facilitate remote monitoring (i.e., monitoring from outside the light fixture) of various performance characteristics of the light fixture. In some implementations, the input-output port 705 may facilitate downloading or uploading data or software over the wired connection from or to the light fixture 700.

The temperature sensor 707 may be any type of temperature sensor. In a typical implementation, the temperature sensor is contained within the housing 502 and is exposed to sense the internal ambient temperature of the housing 502.

The antenna 709 may be any type of wireless antenna. In a typical implementation, the wireless antenna is contained within or coupled to the housing 502 and is at least partially exposed external to the housing 502. In general, the antenna 709 may be used to transfer data, signals, or the like to and from the light fixture 700.

The ambient photosensor 799 may be any type of photosensor. In general, the ambient photosensor 799 is configured to sense light in or around the target area to be illuminated by the light fixture 700. Typically, the ambient photosensor 799 is located on the bottom of the housing 502 and faces in a downward direction.

The flow of power and signals in the light fixture 700 of FIG. 7 is similar to the flow of power and signals in light fixture 500 of FIG. 5. In addition, in the light fixture 700 of FIG. 7, signals flow from the temperature sensor 707, the antenna 709 and the ambient photosensor 799 to the electronic energy management system 511. Also, data flows between the input-output port 705 and the electronic energy management system 711.

FIG. 7B is a perspective view and FIG. 7C is an exploded view of the light fixture 500 in FIG. 5A.

FIG. 8 is a schematic representation showing some of the components in FIG. 7 with details of the illustrated electronic energy management system 711.

In particular, the illustrated electronic energy management system 711 includes a charger controller 713, a smart LED driver 715, a microcontroller 717, a memory storage device 719 and a Wi-Fi module 721.

In a typical implementation, the charger controller 713 and the smart LED driver 715 are similar to the charger controller 513 and the smart LED driver 515 in FIG. 5.

The microcontroller 717 can be any type of microcontroller (e.g., computer-based processor). In some implementations, the microcontroller 717 is a small computer on a single integrated circuit containing a processor core, memory, and programmable input/output peripherals. Program memory may be included on the chip as well. In general, the microcontroller 717 is operable to receive data and signals from a variety of sources, and send control signals to the charger controller 713 and the smart LED driver 715 to control operation of those components.

The memory storage device 719 can be any type of memory storage device including, for example, a RAM module.

The Wi-Fi module 721 allows the light fixture to exchange data wirelessly (using radio waves transmitted by the antenna, for example). In some implementations, this functionality facilitates the use of remote monitoring and/or remote control of the light fixture using corresponding monitoring or control software. The Wi-Fi module may be adapted to communicate utilizing ZigBee, which is a suite of high level communication protocols.

According to FIG. 8, power flows from the high-efficiency photovoltaic cells 504 to the charger controller 713 portion of the electronic energy management system 711. In addition, power flows from the charger controller 713 portion of the electronic energy management system 711 to the rechargeable battery pack 510 to facilitate charging and maintaining charge on the battery. Power also flows from the rechargeable battery pack 510 to the charger controller 713 portion of the electronic energy management system 711, from the charger controller 713 portion to the smart LED driver 715 portion and from the smart LED driver 715 portion to the LEDs 590 to energize the LEDs 590.

In addition, according to the illustrated example, signals flow from the rechargeable battery pack 510 to the charger controller 713 portion of the electronic energy management system 711 to indicate, for example, an amount of charge remaining on the battery. Also, signals flow from the motion sensor 524 to the charger controller 713 portion of the electronic energy management system 711 to indicate sensed motion in the area to be illuminated by the light fixture 700.

A control signal flows from the charger controller 713 to the smart LED driver 715 to control operation of the smart LED driver 715.

In addition, signals flow from the charger controller 713 to the micro-controller 717 and from the ambient photosensor 799 and the temperature sensor 709 to the micro-controller 717. In addition, control signals from the micro-controller 717 to the charger controller 713 and to the smart LED driver 715. Data flows between the antenna 709 and the Wi-Fi module 721, between the Wi-Fi module 721 and the microcontroller 717, between the micro-controller 717 and the memory storage device 719 and between the micro-controller 717 and the input-output port 705.

In some implementations, the light fixture 500 operates substantially as follows.

The charger controller 713 detects day/night transition through the electric charge from the high-efficiency photovoltaic cells 504. The charger controller 713 collects power from the high-efficiency photovoltaic cells 504 during the day and charges the rechargeable battery pack 510. Once night time is detected, the charger controller 713 draws power from the rechargeable battery pack 510 and sends it to the smart LED driver 715, which in turn powers the LEDs 590.

The Microcontroller 717 takes input signals from the charger controller 713, the motion sensor 524, the temperature sensor 707 and the ambient photosensor 799, and sends controls signals to charger controller 713 and to the smart LED driver 715. The Microcontroller 717 exchanges data with the I/O 705, the memory storage device 719 and the WiFi module 721.

Figure 11B:
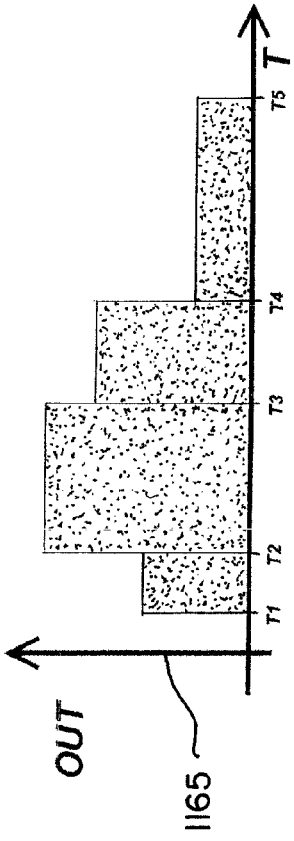
FIG. 11 is a flowchart of a process wherein a light fixture operates under a Smart Adaptive Mode (SAM).
Figure 11C:
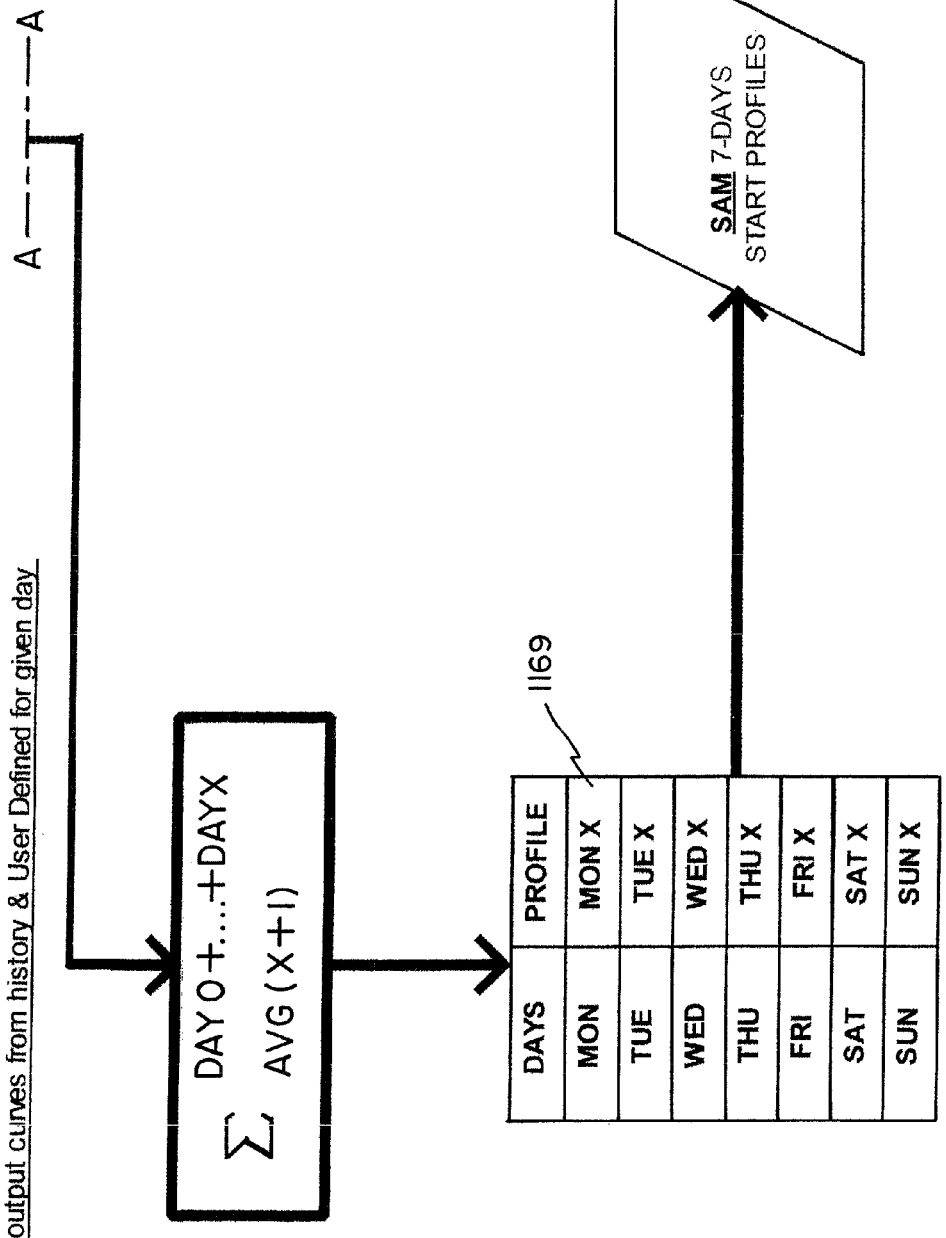

In a typical implementation, the electronic energy management module 711 facilitates two operational modes for the light fixture 700: a User Defined Mode (UDM) (see, FIG. 9), and a Smart Adaptive Mode (SAM) (see, FIG. 11). Typically, a user would be able to select which of these modes the light fixture 700 should operate under.

In general, the UDM (see FIG. 9) dictates the nightly operation profile based on values 951 selected 953 by the user or programmer at time of specification and are programmed into and/or downloaded at the factory through the input-output port 705 to the microcontroller 717, which in turn stores the data in the memory storage device 719. In a typical implementation, these values can include one or more of the following: start times for each segment of the night (e.g., T1, T2, T3, T4, T5 in FIG. 9), a maximum current (Imax in FIG. 9) or light output for the LEDs in certain circumstances, a minimum current (Imin in FIG. 9) or light output for the LEDs in certain circumstances, and an indication of interval priority for each interval (or segment) through the night. The concept of interval priorities can reflect, for example, the relative degree of importance that providing illumination (or a specific amount of illumination) during the different intervals (or segments) through the night.

In the illustrated implementation, the UDM allows the user to divide the night time operation into 4 intervals 955a-955d, specifying a start time and a stop time for each interval.

The user assigns different light level outputs to each interval during a typical nightly operation, for each night of the week. In the illustrated implementation, interval 955a has an assigned light level that corresponds to I2, interval 955b has an assigned light level that corresponds to I4, interval 955c has an assigned light level that corresponds to I3, and interval 955d has an assigned light level that corresponds to I1. Typically, each interval will have a priority value assigned to it based on the information entered by the user.

Based on the information entered by the user or programmer, a UDM day-by-day profile 957 may be created and stored, for example, in a memory storage device. This UDM day-by-day profile may be used 959 by the light fixture to control light levels.

In some implementations, SAM enables the light fixture 700 to adapt to its environment and "learn" the nightly usage pattern in the environment where it is placed in order to provide optimal light level outputs while preserving and further extending battery life.

Referring, for example, to FIG. 11, in a typical implementation, operating under the SAM, at night time the microcontroller 717 records the signals 1161 it receives from the motion sensor 524 and stores them in the memory storage device 719 (e.g., in an array, such as array 1163). Once night time is over, the microcontroller 717 uploads the recorded signals from the memory storage device 719, extrapolates the stored data, and, in some instances, the data entered by the user for UDM, generates an operating output profile 1165 for that night, and stores that operating profile 1167 back in the memory storage device 719 for that specific night of the week. Similar to the UDM profiles, the operating profiles generated while operating under SAM may have 4 time intervals throughout the night and with priority values assigned to each interval.

This process can be repeated on a night-by-night basis to produce a seven-day weekly profile 1169.

In some implementations, the electronic energy management system 711 integrates a built-in smart energy saving system (SESS) that allows light fixture to adjust the LEDs' light output based on the available charge in the battery 510 in order to insure the available battery capacity to power the LEDs over a certain number of consecutive nights (e.g., 7 or more consecutive nights) with no charge. In some implementations, this can help to preserve and extend battery life and can help to insure that the available charge is used when light is needed the most. The decrease of output power can be based either on motion response (e.g., the lights will go on only when motion is detected) or on a proportional decrease mode (e.g., light will decrease proportionally for all intervals of night operation).

Figure 12A:
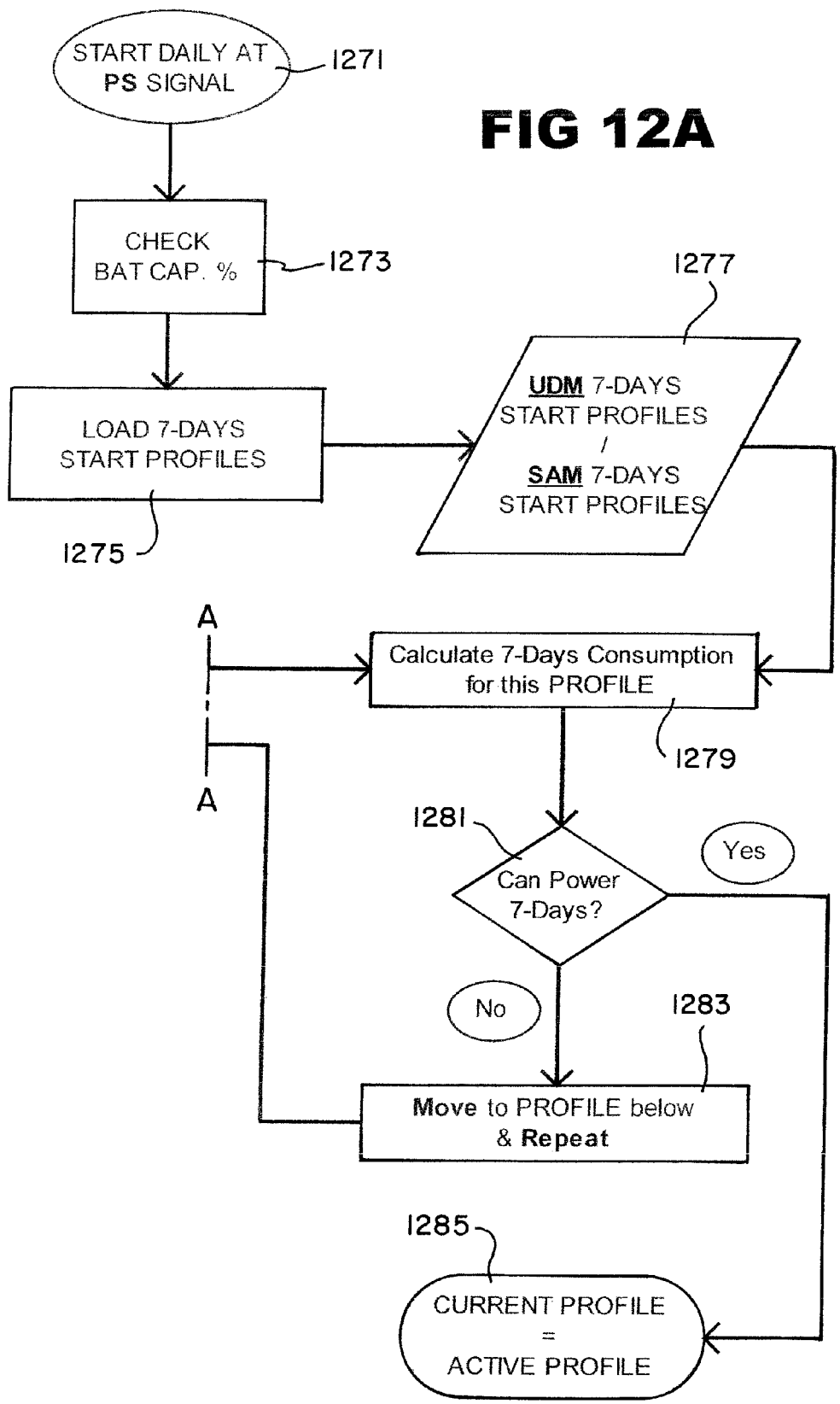
FIG. 12 is a flowchart of a process wherein a light fixture operates under a Smart Occupancy Sensing Mode (SOCSM).
Figure 13A:
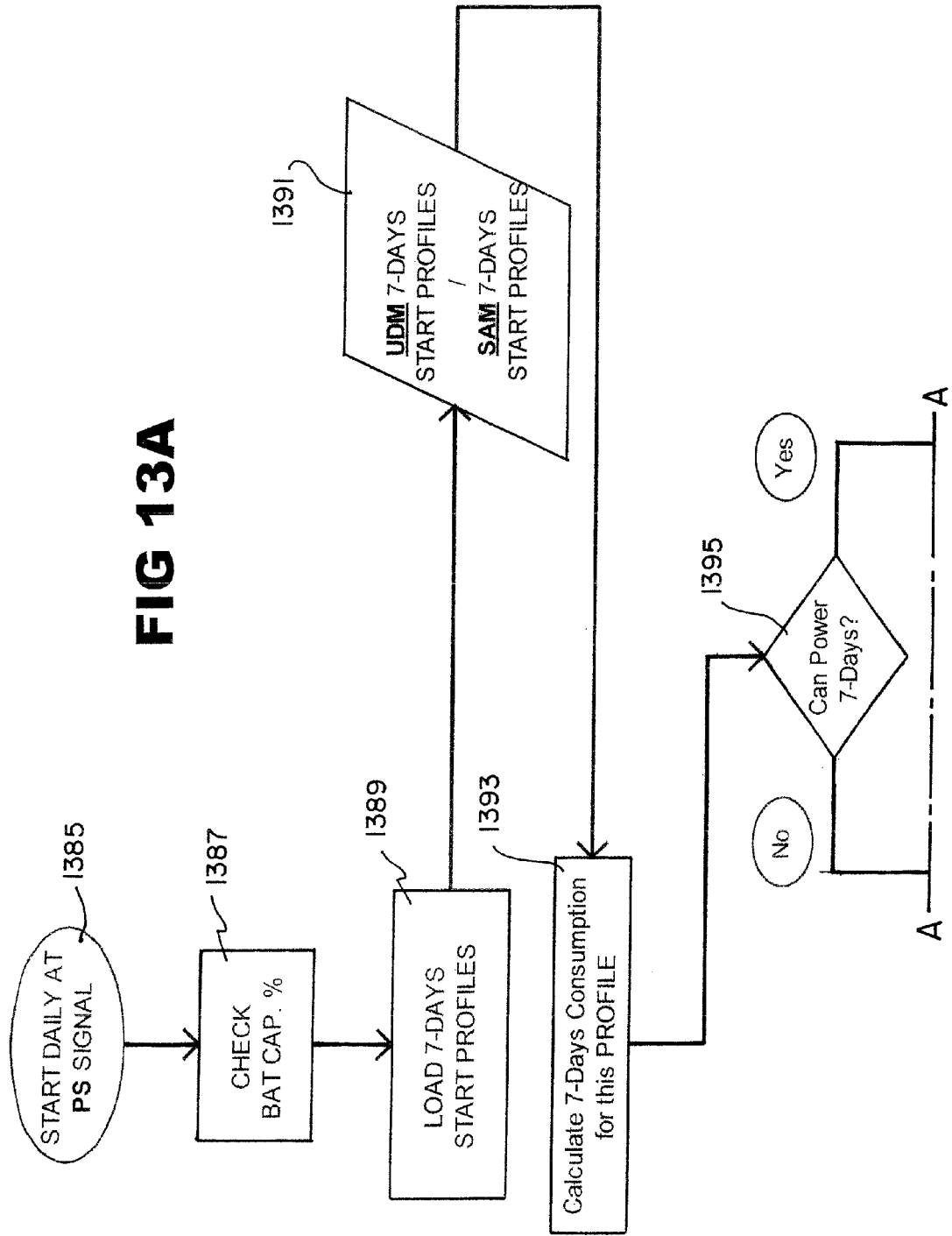
FIG. 13 is a flowchart of a process wherein a light fixture operates under a Propositional Increase/Decrease Mode (PIDM).
Figure 13B:
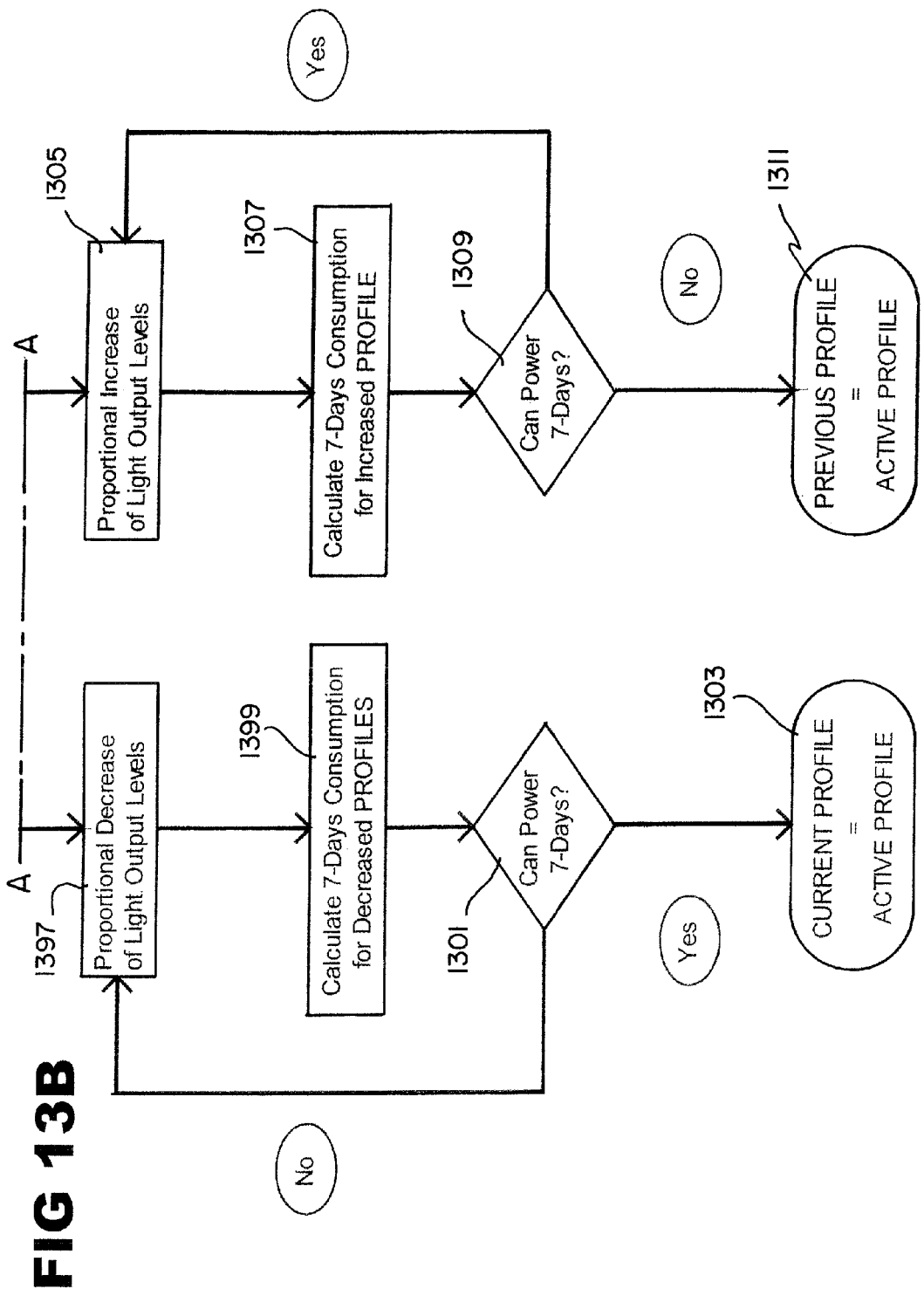

In a typical implementation, the user is able to choose between the two SESS modes: the Smart Occupancy Sensing Mode (SOCSM) (see profile C in FIG. 10 and FIG. 12), and the Propositional Increase/Decrease Mode (PIDM) (see profile D in FIG. 10 and FIG. 13).

In SOCSM (see profile C in FIG. 10 and FIG. 12), when the charger controller 713 detects night time it sends a signal 1271 to the microcontroller 717 which, in turn, checks the available battery capacity 1273. Then the microcontroller 717 uploads the nightly operation profiles 1275 stored in the memory storage device 719 for that specific night of the week from either the UDM or the SAM. Using the output profiles data 1277 stored in the memory storage device 719, the SOCSM algorithm estimates total power consumption 1279 by the LEDs for a 7 consecutive night period. If (at 1281), the microcontroller determines that the result is higher than the current charge in the battery 510 can support, then the microcontroller 717 systematically drops the light output value 1283 to some minimum level Imin for each interval of the nightly operating profile, for a certain number of nights (e.g., 7 consecutive nightly profiles), starting by the lowest priority intervals—according to table 1285 in FIG. 12. The microcontroller then recalculates 1279 consumption for 7 consecutive nights. If (at 1281), the microcontroller determines that the battery charge is sufficient to support 7 nights of power based on the current operating profile under consideration, the microcontroller sets (at 1285) the current operating profile as the active operating profile.

The SOCSM algorithm repeats this routine until the calculated consumption is able to be powered by the available charge in the battery 510. The modified operating profile of that night is then uploaded to the microcontroller registry, which in turn sends signals accordingly to the smart LED driver 715 to power the LEDs 590, accordingly.

Under this scenario, each interval that is assigned to the Imin output value typically operates on that output level until a motion is detected. When motion is detected the motion sensor 524 sends a signal to the microcontroller 717 which in turn sends a signal to the smart LED driver to ramp up the light output some predetermined level Imax corresponding to a comfortable level appropriate in view of the sensed motion.

Subsequently, when no motion is detected by the motion sensor 524 for some predetermined amount of time (e.g., 15 seconds), the microcontroller 717 sends a signal back to the smart LED driver 715 to ramp down the output level to Imin.

In PIDM (see profile D in FIG. 10 and FIG. 13), when the charger controller 713 detects night time it sends a signal 1385 to the microcontroller 717 which, in turn, checks battery capacity 1387, uploads the nightly operation profiles 1389 stored in the memory storage device 719 for that specific night of the week from either the UDM or the SAM 1391.

Using the output profiles data stored in the memory storage device 719, the microcontroller uses a PIDM algorithm to estimate 1393 power consumption for 7 consecutive nights. If the microcontroller determines (at 1395) that the result is higher than the current charge in the rechargeable battery pack 510 can support, then the microprocessor 717 modifies the output profiles 1397 to lower the light output value of each interval proportionally (optionally, based on its assigned priority value), for the 7 consecutive nightly profiles.

The microcontroller then estimate 1399 power consumption for 7 consecutive nights based on the new profiles. If the microcontroller determines (at 1301) that the result is higher than the current charge in the rechargeable battery pack 510 can support, then the microprocessor 717 again modifies the output profiles (at 1397) to lower the light output value of each interval proportionally (optionally, based on its assigned priority value), for the 7 consecutive nightly profiles. The microprocessor repeats this routine until the calculated consumption is able to be powered by the available charge in the rechargeable battery pack 510. Then, is sets (at 1303) whatever profile is current to be the active profile.

The modified operating profile of that particular night is then uploaded to the microcontroller registry, which, in turn, sends signals accordingly to the smart LED driver 715 to power the LEDs 590.

If, at 1395, the microcontroller determines that the charge on the battery is actually sufficient to power for 7-days according to the current profile, then the microcontroller 717 may proportionately increase the light output levels (at 1305). This adjustment also may optionally be based on the assigned priority values for each interval or segment, for the 7 consecutive nightly profiles.

The microcontroller then estimate 1307 power consumption for 7 consecutive nights based on the new profiles. If the microcontroller determines (at 1309) that the result is still less than the current charge in the rechargeable battery pack 510 can support, then the microprocessor 717 may again modify the output profiles (at 1305) to increase the light output value of each interval proportionally (optionally, based on its assigned priority value), for the 7 consecutive nightly profiles. The microprocessor repeats this routine until the calculated consumption exceeds the capability of the current charge on the battery. When that point is hit, the microcontroller sets (at 1311) the previous profile considered to be the active profile.

The modified operating profile of that particular night is then uploaded to the microcontroller registry, which, in turn, sends signals accordingly to the smart LED driver 715 to power the LEDs 590.

In some implementations, the electronic energy management system 511 includes a color temperature shift system (CTSS). In a typical implementation, the CTSS mixes warm white (WW) and cool white (CW) correlated color temperature (CCT) LEDs. In some implementations, the CTSS progressively shifts power from the WW LEDs at dusk to the CW LEDs at dawn, thus maintaining light at an appropriate level in view of sunlight conditions while decreasing overall energy required by using the generally higher-efficiency CW LEDs for some period of time rather than the WW LEDs.

In general, various implementations of the light fixture disclosed herein combine very high efficiency components with specific functionalities that also facilitate very high-efficiency performance of the light fixture.

A number of embodiments of the invention have been described. Nevertheless, it will be understood that various modifications may be made without departing from the spirit and scope of the invention.

For example, the absolute and relative sizes and shapes of the various components of the light fixture may vary considerably. Additionally, the specific arrangement of components relative to the housing may vary considerably. The light fixture may include some, but not all, of the components and/or features disclosed in the different implementations disclosed herein. In addition, the various components and/or features disclosed may be combined in a variety of ways.

Additionally, the steps in each process disclosed herein may be implemented in different orders. Moreover, in some implementations, certain steps may be omitted completely. The steps in the processes may be implemented using one processor (e.g., the microcontroller) or they may be implemented using different components, even some which are physically located external to the light fixture, working together.

The specific mounting hardware for mounting the light fixture can vary considerably and be adapted to produce different visual effects and to support one or more light fixtures in a variety of different ways.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary relative terms "below" and "under" can encompass both an orientation of above and below. The device may be otherwise oriented (e.g., rotated 360 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

Any processing element (e.g., microcontrollers or the like) can be implemented as one or more processing elements, either in a one physical location or distributed across multiple locations (e.g., multiple circuit boards). Similarly, any memory storage device can be implemented as one or more memory storage device, either in one physical location or distributed across multiple locations (e.g., multiple circuit boards).

Accordingly, other implementations are within the scope of the claims.

What is claimed is:

1. A compact, autonomous, solar-powered, modular light fixture comprising:
   a housing comprising:
      a lower portion having an outer surface with a rounded shape that is substantially symmetrical about a vertical axis that passes through a center of the lower portion and an upper portion of the housing; and
      the upper portion comprising a flat surface that is disposed at an angle less than 15° relative to horizontal;
   photovoltaic cells at the flat surface of the upper portion of the housing configured to receive sunlight from above the light fixture;
   a light source configured to emit light from the lower portion of the housing in a downward direction;
   an energy storage device inside the housing to receive energy from the photovoltaic cells and to provide energy to the light source; and
   an electronic energy management system inside the housing for controlling, charge associated with the photovoltaic cells, the energy storage device and the light source.

2. The compact, autonomous, solar-powered, modular light fixture of claim 1 further comprising concentrating optics at least partially covering the photovoltaic cells,
   wherein the concentrating optics are configured so as to enable the photovoltaic cells to operate with an efficiency that the photovoltaic cells alone would operate at if the photovoltaic cells alone were disposed at a steeper angle relative to horizontal.

3. The compact, autonomous, solar-powered modular light fixture of claim 2, wherein the concentrating optics are configured to modify a direction of incident sunlight toward the photovoltaic cells.

4. The compact, autonomous, solar-powered modular light fixture of claim 2, wherein the concentrating optics reduce tilt and increase performance and reliability and a lower incidence angle throughout the year.

5. The compact, autonomous, solar-powered, modular light fixture of claim 1 wherein the photovoltaic cells are photovoltaic cells with a conversion efficiency of at least 15%.

6. The compact, autonomous, solar-powered, modular light fixture of claim 5 wherein the high-efficiency photovoltaic cells comprise crystalline photovoltaic cells and/or multi junction photovoltaic cells and/or any other type of high-efficiency photovoltaic cell technology.

7. The compact, autonomous, solar-powered, modular light fixture of claim 1 wherein the light fixture can he rotated 360° to accommodate any solar irradiation while sustaining a consistent appearance.

8. The compact, autonomous, solar-powered, modular light fixture of claim 1 wherein the housing is configured so as to rest upon a support structure and extend through an aperture defined by the support structure, and wherein the light fixture is configured such that, when resting upon the support structure, the light fixture visually appears substantially the same regardless of which direction the photovoltaic cells are oriented.

9. The compact, autonomous, solar-powered, modular light fixture of claim 1 wherein the flat surface where the photovoltaic cells are disposed is not perpendicular to the vertical axis.

10. The compact, autonomous, solar-powered, modular light fixture of claim 1 further comprising, within the housing: a charge controller or charge controller functionality within the electronic energy management system for controlling charge associated with the photovoltaic cells, the energy storage device and the light source.

11. The compact, autonomous, solar-powered, modular light fixture of claim 1 further comprising an internal heat management configuration that comprises: a heat sink in thermal contact with at least the light source and in direct or indirect contact with the housing; and an insulating layer or element to thermally insulate the light source from the internal components.

12. The compact, autonomous, solar-powered., modular light fixture of claim 11 wherein an air gap extends over an entirety of the heat sink within the housing.

13. The compact, autonomous, solar-powered, modular light fixture of claim 11 further comprising: a physical separator inside the housing that defines separate chambers inside the housing, wherein the chamber that contains at least the energy storage device is in part or in whole substantially weather-proof, and wherein the chamber that at least partially contains or supports at least the light source has a plurality of perforations that permits air flow through the housing.

14. The compact, autonomous, solar-powered, modular light fixture of claim 1 further comprising a motion sensor coupled to the housing and configured to sense motion within an area that can be illuminated by the light source.

15. The compact, autonomous, solar-powered, modular light fixture of claim 1 wherein a lower portion of the housing has a cross-section adapted to be supportable by a support structure that is substantially circular, substantially crescent-shaped, substantially horseshoe-shaped, substantially u-shaped, substantially v-shaped or substantially semi-circular.

16. The compact, autonomous, solar-powered, modular light fixture of claim 1 further comprising a self-cleaning coating at an outer, exposed surface of the light fixture proximate the photovoltaic cells, wherein the self-cleaning surface facilitates maintaining optical performance of the photovoltaic cells.

17. The compact, autonomous, solar-powered, modular light fixture of claim 1 further comprising a non-reflective coating at an outer, exposed surface of the light fixture proximate the photovoltaic cells, wherein the non-reflective surface facilitates maintaining optical performance of the-photovoltaic cells.

18. The compact, autonomous, solar-powered, modular light fixture of claim 1 wherein the light fixture is adapted to produce useful light levels for general illumination per recommended practices at a mounting height of at least 10 feet.

19. The compact, autonomous, solar-powered, modular light fixture of claim 1 wherein the light fixture is adapted to produce at least 500 lumens at approximately 100% output.

20. The compact, autonomous, solar-powered, modular light fixture of claim 1 wherein the electronic energy management system is operable to divide nighttime operation of the light fixture into multiple intervals, each of which being associated with the light source producing a respective corresponding amount of light.

21. The compact, autonomous, solar-powered, modular light fixture of claim 1 wherein the electronic energy management system enables a user: to specify a start time and an end time for each one of multiple intervals, and to assign an amount of light to be produced by the light source during each respective one of the multiple nighttime intervals.

22. The compact, autonomous, solar-powered, modular light fixture of claim 21 wherein the corresponding amount of light produced by the light source during each one of the multiple nighttime intervals is based, at least in part, on historical information gathered by an electronic motion sensor coupled to the housing during previous nights.

23. The compact, autonomous, solar-powered, modular light fixture of claim 1 wherein the electronic energy management system is operable to monitor a charge associated with the energy source and, if the monitored charge drops below a predetermined level, the electronic energy management system causes the light source to produce a lower amount of light than the light source otherwise would have produced based on the user-assigned amount of light to be produced during that particular one of the intervals.

24. The compact, autonomous, solar-powered, modular light fixture of claim 23 wherein the lower amount of light produced is determined based on a goal of being able to produce a minimum amount of light during night time hours over a specified number of days.

25. The compact, autonomous, solar-powered modular light fixture of claim 1 with a universal mounting system.

26. The compact, autonomous, solar-powered, modular light fixture of claim 1, wherein the light fixture is configured so as to either stand alone or to be grouped with other identical light fixtures on a common support structure to provide various levels of lighting for particular applications.

27. The light fixture of claim 1, wherein every one of the photovoltaic cells in the light fixture is at the flat surface of the upper housing.

28. The light fixture of claim 1, further comprising tertiary optics beneath the light source, wherein the tertiary optics are adapted to control the shape of or otherwise influence a character of light produced by the light source.

29. A lighting system or installation comprising:
one or more compact, autonomous, solar-powered, modular light fixtures; and
one or more support structures supporting the one or more light fixtures, wherein each of the one or more light fixtures comprises:
a housing comprising;
a lower portion having an outer surface with a rounded shape that is substantially symmetrical about a vertical axis that passes through a center portion of the lower portion of the housing and the upper portion of the housing; and
the upper portion comprising a flat surface that is disposed at an angle less than 15° relative to horizontal;
photovoltaic cells at the flat surface of the upper portion of the housing configured to receive sunlight from above the light fixture;
a light source configured to emit light from the lower portion of the housing in a downward direction;
an energy storage device inside the housing to receive energy from the photovoltaic cells and to provide energy to the light source; and
an electronic energy management system inside the housing for controlling charge associated with the photovoltaic cells, the energy storage device and the light source; and wherein each of the one or more support structures defines one or more openings, each of which is configured such that a circumference of the housing of one of the light fixtures can rest upon it, with the lower portion of the light fixture extending through the opening.

30. The lighting system or installation of claim 29, wherein each of the one or more lighting fixtures further comprises concentrating optics at least partially covering the photovoltaic cells; and
wherein, in each of the one or more light fixtures: the concentrating optics are configured so as to enable the photovoltaic cells to operate with an efficiency that the photovoltaic cells alone would operate at if the photovoltaic cells alone were disposed at a steeper angle relative to horizontal.

31. The lighting system or installation of claim 29, wherein, in each of the one or more light fixtures: the axis passes through the lower portion and the upper portion of the housing.

32. The lighting system or installation of claim 29, wherein, in each of the one or more light fixtures, the housing is configured so as to rest upon one of the support structures and extend through an aperture defined by the support structure, and when resting upon the support structure and viewed from below, the light fixture appears substantially the same regardless of which direction the photovoltaic cell module is oriented.

33. The lighting system or installation of claim 29, wherein, in each of the one or more light fixtures, the flat surface where the photovoltaic cells are disposed is not perpendicular to the axis when supported in a corresponding one of the support structures.

34. The lighting system or installation of claim 29, wherein the support structure is part of a cable system, is formed in a fence, is formed in a canopy, is formed in a marquee or is formed in a ceiling and/or a combination of any of these.

35. The lighting system or installation of claim 29, wherein the support structure is configured to support a plurality of the light fixtures.

36. The lighting system or installation of claim 29, wherein the number of light sources supported by the support structure is based on a desired lighting level in an area intended to be illuminated by the lighting system.

37. The lighting system or installation of claim 29, wherein each of the light sources is adapted to produce at least 500 lumens at approximately 100% output.

38. The lighting system or installation of claim 30, wherein the concentrating optics are configured to modify a direction of incident sunlight toward the photovoltaic cells.

39. The lighting system or installation of claim 30, wherein the concentrating optics reduce tilt and increase performance and reliability and a lower incidence angle throughout the year.

40. The light system or installation of claim 29 wherein each of the one or more support structures is substantially circular in shape so as to closely contact the rounded shape of the lower portion of the housing when one of the light fixtures is coupled to the support structure.

41. A lighting system comprising:
one or more compact, autonomous, solar-powered, modular light fixtures; and
one or more support structures supporting the one or more light fixtures,
wherein each of the one or more light fixtures comprises:
a housing comprising:
a lower portion having an outer surface with a rounded shape that is substantially symmetrical about a vertical axis that passes through a center of the lower portion and an upper portion of the housing; and
the upper portion comprising a flat surface that is disposed at an angle less than 15° relative to horizontal;
photovoltaic cells at the flat surface of the upper portion of the housing configured to receive sunlight from above the light fixture;
concentrating optics at least partially covering the photovoltaic cells;
a light source configured to emit light from the lower portion of the housing, in a downward direction;
an energy storage device inside the housing to receive energy from the photovoltaic cells and to provide energy to the light source;
an electronic energy management system inside the housing for controlling charge associated with the photovoltaic cells, the energy storage device and the light source; and
tertiary optics beneath the light source, wherein the tertiary optics are adapted to control the shape of or otherwise influence a character of light produced by the light source,
wherein each of the one or more support structures comprises a surface that defines one or more openings, each of which is configured such that the lower portion of the housing of one of the light fixtures can rest upon it, with the lower portion of the light fixture extending at least partially through the opening, and
wherein the light fixture is adapted to produce at least 500 lumens at approximately 100% output.

* * * * *